United States Patent
Petivan et al.

(10) Patent No.: US 6,349,391 B1
(45) Date of Patent: Feb. 19, 2002

(54) REDUNDANT CLOCK SYSTEM AND METHOD FOR USE IN A COMPUTER

(75) Inventors: James L. Petivan, Palo Alto; Jonathan K. Lundell, Half Moon Bay; Don C. Lundell, Boulder Creek, all of CA (US)

(73) Assignee: Resilience Corporation, Sunnyvale, CA (US)

( * ) Notice: Subject to any disclaimer, the term of this patent is extended or adjusted under 35 U.S.C. 154(b) by 0 days.

(21) Appl. No.: 09/428,701

(22) Filed: Oct. 27, 1999

Related U.S. Application Data

(62) Division of application No. 08/853,670, filed on May 9, 1997.
(60) Provisional application No. 60/017,201, filed on May 16, 1996, and provisional application No. 60/037,363, filed on Jan. 31, 1997.

(51) Int. Cl.[7] ................................................. G06F 11/00
(52) U.S. Cl. ........................................... 714/11; 712/10
(58) Field of Search ............................... 714/11, 2, 5, 8, 714/9, 10, 20, 25, 39, 41; 712/10, 11, 16, 20, 28, 220

(56) References Cited

U.S. PATENT DOCUMENTS 3,538,498 A   11/1970   Games et al.

(List continued on next page.)

FOREIGN PATENT DOCUMENTS

EP   0 447 577 A   9/1991

(List continued on next page.)

OTHER PUBLICATIONS

Abraham et al., "An Algorithm for the Accurate Reliability Evaluation of Triple Modular Redundancy Networks," *IEEE Trans. on Computers* C–23(7): 682–692 (Jul. 1974).

(List continued on next page.)

*Primary Examiner*—Nadeem Iqbal
(74) *Attorney, Agent, or Firm*—Morrison & Foerster LLP

(57) ABSTRACT

A redundant clock system for use in a computer is provided including a first oscillator which produces first reference clock signals; a second oscillator which produces second reference clock signals; a third oscillator which produces third reference clock signals; a first multiplexer which receives the first, second and third reference clock signals from the first, second and third oscillators and which provides a designated one of the received reference clock signals as a selected reference clock signal; a second multiplexer which receives the first, second and third reference clock signals from the first, second and third oscillators and which provides a designated one of the received reference clock signals as a selected reference clock signal; a third multiplexer which receives the first, second and third reference clock signals from the first, second and third oscillators and which provides a designated one of the received reference clock signals as a selected reference clock signal; a first phase-locked loop (PLL) circuit coupled in a first feedback circuit in which the first PLL receives as reference input the selected reference clock signal provided by the first multiplexer and receives as feedback input a first output clock signal; a second phase-locked loop (PLL) circuit coupled in a second feedback circuit in which the second PLL receives as reference input the selected reference clock signal provided by the second multiplexer and which receives as feedback input the a second output clock signal; a third phase-locked loop (PLL) circuit coupled in a third feedback circuit in which the third PLL receives as reference input the selected reference clock signal provided by the third multiplexer and receives as feedback input a third output clock signal; and a reference clock designation unit which determines whether any one of the first, second or third reference clock signals has failed and which designates one of the two other reference clock signals in the event that one of the reference clock signals has failed.

17 Claims, 13 Drawing Sheets

U.S. PATENT DOCUMENTS

| | | | |
|---|---|---|---|
| 3,665,173 A | 5/1972 | Bouricius et al. | |
| 3,848,116 A | 11/1974 | Moder et al. | |
| 3,900,741 A | 8/1975 | Fletcher et al. | |
| 4,015,246 A | 3/1977 | Hopkins, Jr. et al. | |
| 4,356,546 A | 10/1982 | Whiteside et al. | |
| 4,375,683 A | 3/1983 | Wensley | |
| 4,392,199 A | 7/1983 | Schmitter et al. | |
| 4,402,045 A | 8/1983 | Krol | |
| 4,453,215 A | 6/1984 | Reid | |
| 4,644,498 A | 2/1987 | Bedard et al. | |
| 4,654,857 A | 3/1987 | Samson et al. | |
| 4,683,570 A * | 7/1987 | Bedard et al. | 714/797 |
| 4,726,026 A | 2/1988 | Hilford et al. | |
| 4,750,177 A | 6/1988 | Hendrie et al. | |
| 4,777,332 A | 10/1988 | Diaz | |
| 4,779,008 A * | 10/1988 | Kessels | 327/147 |
| 4,817,091 A | 3/1989 | Katzman et al. | |
| 4,819,159 A | 4/1989 | Shipley et al. | |
| 4,870,704 A | 9/1989 | Matelan et al. | |
| 4,907,232 A | 3/1990 | Harper et al. | |
| 4,937,734 A | 6/1990 | Bechtolsheim | |
| 4,965,717 A | 10/1990 | Cutts, Jr. et al. | |
| 4,967,347 A | 10/1990 | Smith et al. | |
| 4,972,415 A | 11/1990 | Walter et al. | |
| 4,984,241 A | 1/1991 | Truong | |
| 5,020,024 A | 5/1991 | Williams | |
| 5,084,878 A | 1/1992 | Kanekawa et al. | |
| 5,099,485 A | 3/1992 | Buckert et al. | |
| 5,117,442 A | 5/1992 | Hall | |
| 5,121,487 A | 6/1992 | Bechtolsheim | |
| 5,146,585 A | 9/1992 | Smith, III | |
| 5,193,175 A | 3/1993 | Cutts, Jr. et al. | |
| 5,231,640 A | 7/1993 | Hanson et al. | |
| 5,249,188 A | 9/1993 | McDonald | |
| 5,249,206 A | 9/1993 | Appelbaum et al. | |
| 5,269,016 A | 12/1993 | Butler et al. | |
| 5,271,023 A | 12/1993 | Norman | |
| 5,276,823 A | 1/1994 | Cutts, Jr. et al. | |
| 5,295,257 A | 3/1994 | Berkovich et al. | |
| 5,295,258 A | 3/1994 | Jewitt et al. | |
| 5,317,726 A | 5/1994 | Horst | |
| 5,325,518 A | 6/1994 | Bianchini, Jr. | |
| 5,361,337 A | 11/1994 | Okin | |
| 5,448,723 A | 9/1995 | Rowett | |
| 5,588,111 A | 12/1996 | Cutts, Jr. et al. | |
| 5,630,056 A | 5/1997 | Horvath et al. | |
| 5,689,689 A | 11/1997 | Meyers et al. | |
| 5,742,753 A | 4/1998 | Nordsieck et al. | |
| 5,751,955 A | 5/1998 | Sonnier et al. | |
| 5,787,095 A | 7/1998 | Myers et al. | |
| 5,799,022 A | 8/1998 | Williams | |
| 5,838,900 A | 11/1998 | Horvath et al. | |
| 5,903,717 A * | 5/1999 | Wardrop | 714/12 |
| 5,993,055 A * | 11/1999 | Williams | 371/22.4 |
| 6,141,770 A * | 10/2000 | Fuchs et al. | 714/11 |

FOREIGN PATENT DOCUMENTS

| | | | |
|---|---|---|---|
| JP | 05 204692 A | 8/1993 | |
| JP | 06 250867 A | 9/1994 | |
| WO | 92/03787 A | 3/1992 | |
| WO | 94/02896 | 2/1994 | |
| WO | US97/08320 | 12/1998 | |

OTHER PUBLICATIONS

Ali et al., "TMR Crystal Controlled Clock," *Proceedings of the IEEE* 69(6):756–757 (Jun. 1981).

Avizienis, "Fault–Tolerant Computing–Progress, Problems, and Prospects,"in *Proceedings IFIP Congress*, pp. 405–420 (New York: North Holland 1977).

Brasileiro et al., "TMR Processing without Explicit Clock Synchronisation," *Proceedings of the IEEE Symposium on Reliable Distributed Systems*, pp. 186–195 (IEEE, Los Alamitos, CA 1995).

Davies et al., "Synchronization and Matching in Redundant Systems," *IEEE Trans. on Computers* C–27(6):531–539 (Jun. 1978).

Gurzi, "Estimates for Best Placement of Voters in a Triplicated Logic Network," *IEEE Trans. on Elec. Computers* EC–14(5):711–717 (Oct. 1965).

Ihara et al., "Fault–Tolerant Computer System with Three Symmetric Computers," *Proceedings of the IEEE* 66(10):1160–1177 (Oct. 1978).

Lamport et al., "The Byzantine Generals Problem,"*ACM Transactions on Programming Languages and Systems* 4(3):382–401 (Jul. 1982).

Lewis, "A Fault–Tolerant Clock Using Standby Sparing," in *Digest of 9th International Sypsosium on Fault–Tolerant Computing*, pp. 33–39 (IEEE Computer Society, Madison, WI 1979).

Longden et al., "An Assessment of the Value of Triplicated Redundancy in Digital Systems," in *Micoelectronics and Reliability* 5:39–55 (Elmsford, NY: Pergamon Press 1966).

Lyons et al., "The Use of Triple–Modular Redundancy to Improve Computer Reliability," *IBM J. Res. and Dev.* 6(2):200–209 (Apr. 1962).

McCluskey et al., "Comparative Architecture of High–Availability Computer Systems," in *Proc. CompCon*, pp. 288–293 (IEEE 1977).

Ozguner et al., "A Reconfigurable Multiprocessor Architecture of Reliable Control of Robotic Systems," 1985 IEEE International Conference on Robotics and Automation Mar. 25–28 1985, pp. 802–806 (XP 000647411)(St. Louis, MO Mar. 25, 1985).

Pease et al., "Reaching Agreement in the Presence of Faults," *Journal of the ACM* 27(2):228–234 (Apr. 1980).

Pradhan, *Fault–Tolerant Computer System Design*, Chapter 2, pp. 102–122 (Prentice Hall 1996).

Ramarao et al., "On the Diagnosis of Byzantine Faults," in *Proceedings of the 7th Symposium on Reliable Distributed Systems*, pp. 144–153 (Columbus, OH 1988).

Shih, et al., A System Design For Real–Time Fault Tolerant Computer Networks, IEEE, Trans. System Sciences, vol. 1, pp. 346–354 (Nov. 1989).

Upadhyyaya et al., Analysis of a Fault–Tolerant Scheme For Processor Ensembles, IEEE International Workshop, pp. 294–302 (Jun. 1992).

Wakerley, "Microcomputer Reliability Improvement Using Triple–Modular Redundancy," *Proc. IEEE* 64(6):889–895 (Jun. 1976).

Williams, "New Approach Allows Painless Move to Fault Tolerance," *Computer Design* 31(5) (Littleton, MA May 1992).

Yoneda et al., "Interrupt Handling in the Loosely Synchronized TMR System," *Systems and Computers in Japan* 16(5):50–59 (1985).

Youn et al. Fault–Tolerant Sorting Using VLSI Processor Arrays, IEEE, International Workshop, pp. 25–32 (Sep. 1993).

* cited by examiner

Fig. 12

REDUNDANT CLOCK SYSTEM AND METHOD FOR USE IN A COMPUTER

RELATED APPLICATIONS

This application is a divisional of U.S. patent application Ser. No. 08/853,670 issued May 9, 1997 provisional U.S. Ser. No. 60/037,363 filed Jan. 31, 1997 under Express Mail label number EM 089 162 982 US, of provisional patent application Ser. No. 60/017,201 filed May 16, 1996, by James L. Petivan, Don C. Lundell and Jonathan K. Lundell, for "Triple Modular Redundant Computer System."

BACKGROUND OF THE INVENTION

1. Field of the Invention

The invention relates in general to fault tolerant computer systems, and more particularly, to redundant fault tolerant computer systems.

2. Description of the Related Art

The reliability of computer system continues to become increasingly important as dependence upon computers continues to increase. See *Reliable Computer Systems,—Design and Evaluation*, by Daniel P. Siewiorek and Robert S. Swarz, Digital Press, 1992. Fault tolerant computer systems employ redundant to guard against system failure. If one redundant element, fails then another element takes over for the failed element. For example, a typical triple modular redundant computer system may employ three processors. If one processor fails, then another of the three processors is available to take over for the failed processor. See *Fault Tolerant Computer System Design*, by Dhiraj K. Pradhan, Prentice Hall, Inc., 1995.

BRIEF DESCRIPTION OF THE DRAWINGS

FIG. 12 is an illustrative timing diagram pertaining to a DMA Write operation in a TMR system employing bridge logic units like that in FIG. 7.

DETAILED DESCRIPTION OF THE PREFERRED EMBODIMENT

1.0 System Architecture Overview

1.1 Conventional Sun SPARCstation 5 Workstation

Figure 1:
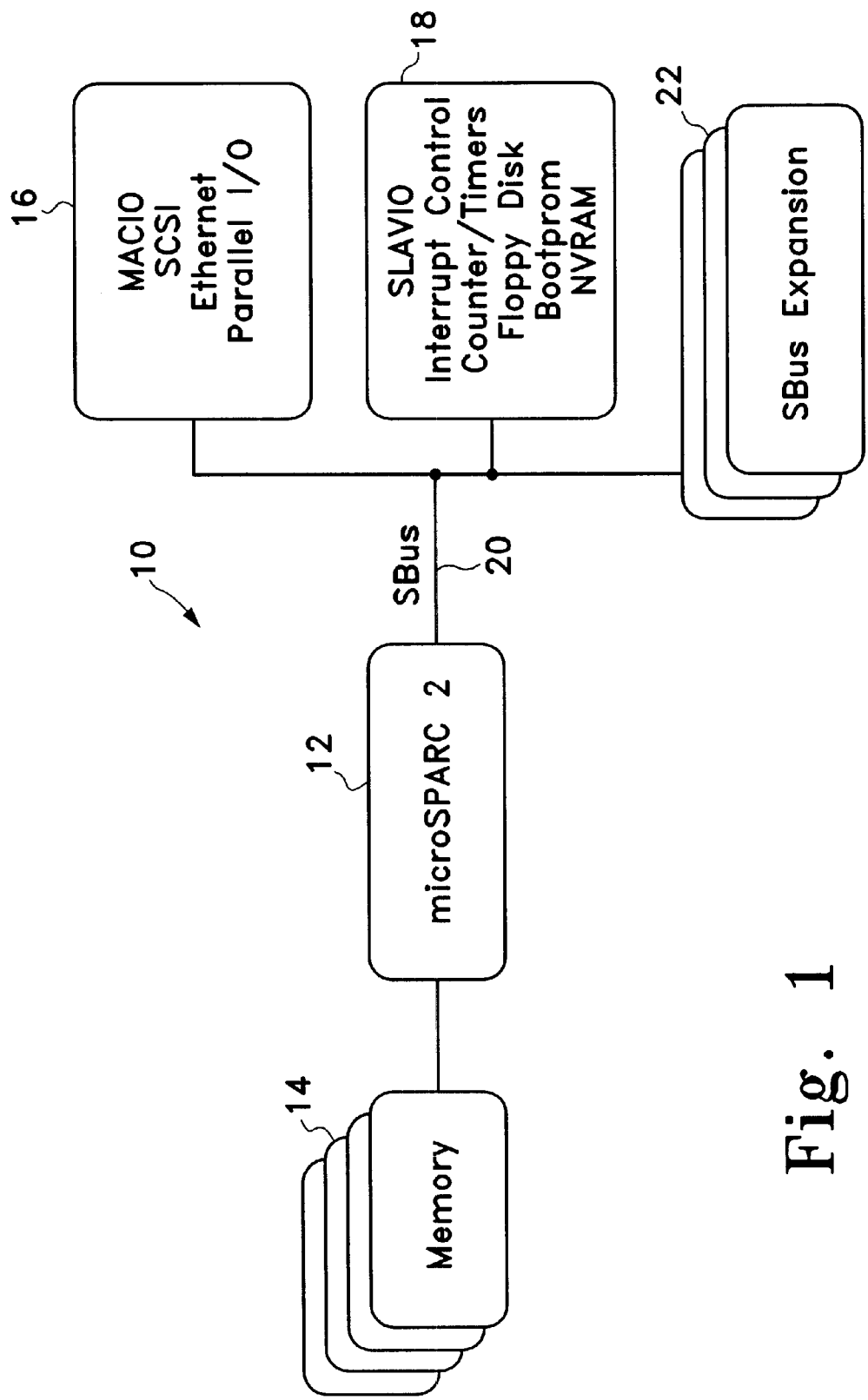
FIG. 1 is a generalized block diagram of an exemplary conventional computer system.

A presently preferred embodiment of the invention is based upon the architecture of the Sun Microsystems, Inc., SPARCstation 5 (TM) (SS5), a RISC workstation that runs the Solaris 2 (TM) operating system, a Unix (TM) variant. The SS5 is highly integrated. Referring to the drawing of FIG. 1, there is shown a generalized block diagram of a conventional SS5 computer system 10. The computer system includes a processor 12 plus system memory 14 and Input/Output (I/O) components 16 and 18. The processor 12 and the I/O components 16 and 18 communicate over an SBus 20 which may include SBus expansion slots 22. Details of SBus operation are described in SBus Handbook, by Susan A. Mason, Sunsoft Press, a Prentice Hall Title, 1994.

1.2 System Module

The presently preferred embodiment includes three redundant system modules, each of which essentially implements a SPARCstation 5 computer system. In addition to the SS5 implementation, each system board includes a bridge logic unit that allows the three system boards to exchange data, compare signals in order to detect faults, share I/O devices, and connect to a common backplane.

Figure 2:
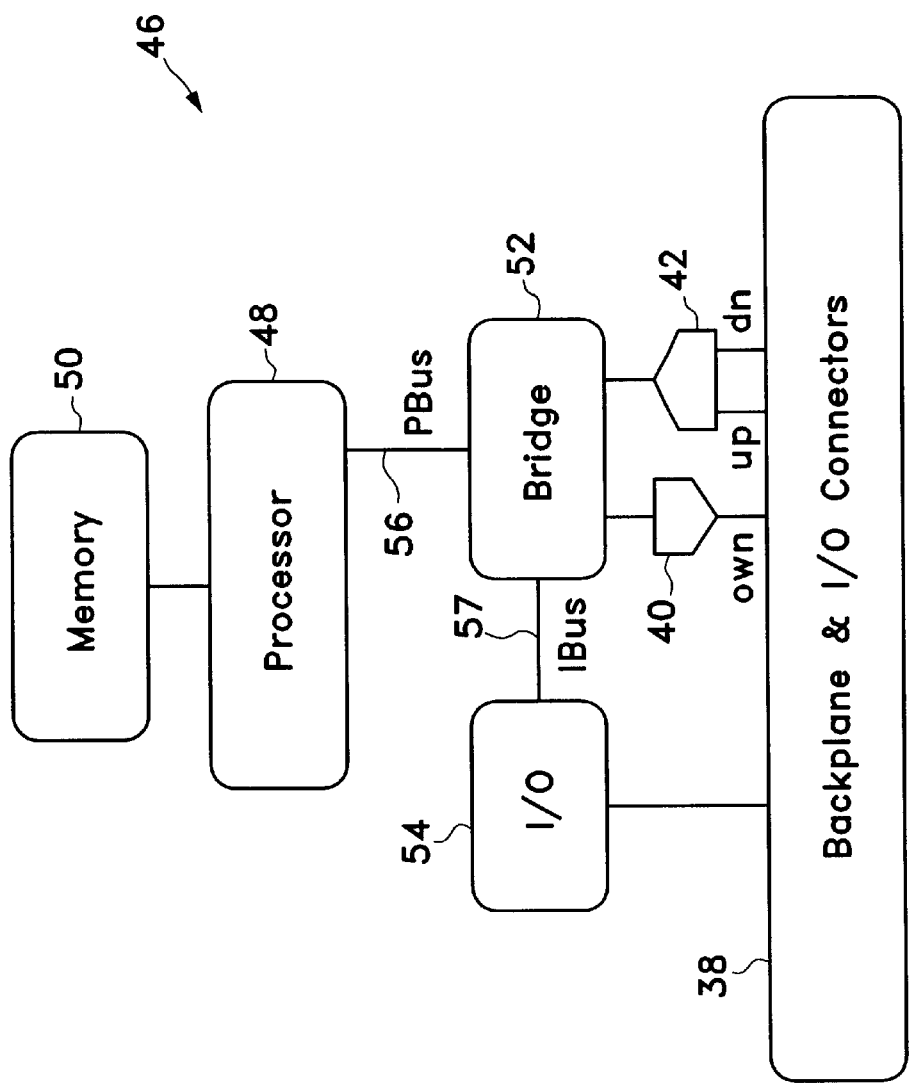
FIG. 2 is a generalized block diagram of a system module in accordance with a presently preferred embodiment of the invention.

Referring to the illustrative drawing of FIG. 2, there is shown a generalized block diagram of a system module 46 in accordance with a current implementation of the invention. The system module 46 includes a processor 48 and system memory 50. The module 46 also includes Input/Output (I/O) controllers 54 and a bridge logic unit 52. The processor 48 and bridge logic unit 52 are connected via a bus 56, in this case an SBus. 54 and bridge logic unit 52 are connected via a bus 57, in this case an SBus.

The system module 46 is coupled to an interconnect unit 38 which interconnects the three system modules, and which interconnects actual I/O connectors (not shown) to the three system modules. In a presently preferred embodiment, the interconnect unit 38 is implemented as a PC board and may be referred to as a "backplane." The interconnect unit 38 includes first connections 40 whereby the respective bridge logic unit 52 of each module can broadcast the module's "own" I/O bus transaction information for delivery to other modules. The interconnect 38 unit also includes second connections 42 whereby the respective bridge logic unit of each module can receive bus transaction, information broadcast by the bridge logic unit of neighboring "upstream" and "downstream" modules. The present interconnect unit also has disposed on it the physical I/O connectors (details not shown) which communicate with the I/O controllers on the system modules. It will be appreciated, of course, that the physical location of the I/O connectors and the I/O controllers may be changed without departing from the scope of the invention.

1.3 Multiple Module System

Figure 3:
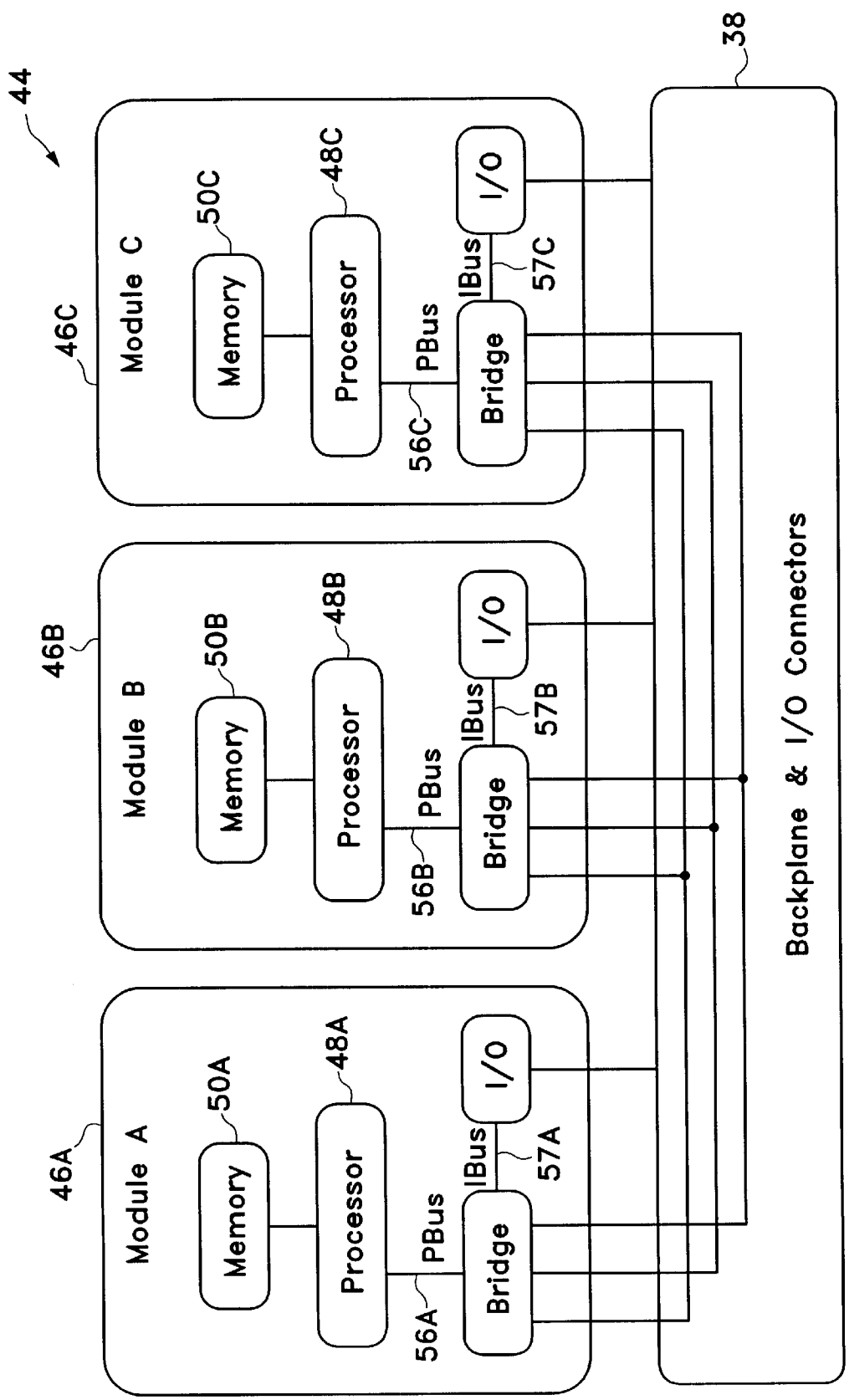
FIG. 3 is a generalized block diagram of a triple modular redundant (TMR) computer system, which includes three system modules of the type illustrated in FIG. 2, in accordance with a presently preferred embodiment of the invention.

Referring to the illustrative drawing of FIG. 3, there is shown a block diagram of a triple modular redundant (TMR)

computer system 44 in accordance with the presently preferred embodiment of the invention. The presently preferred embodiment includes three system modules 46A, 46B and 46C. Each module includes a processor 48A, 48B, 48C, system memory 50A, 50B, 50C, bridge logic units 52A, 52B, 52C and I/O controllers 54A, 54B, 54C, and three independent processor buses 56A, 56B, 56C and three independent I/O buses 57A, 57B and 57C.

Figure 4:
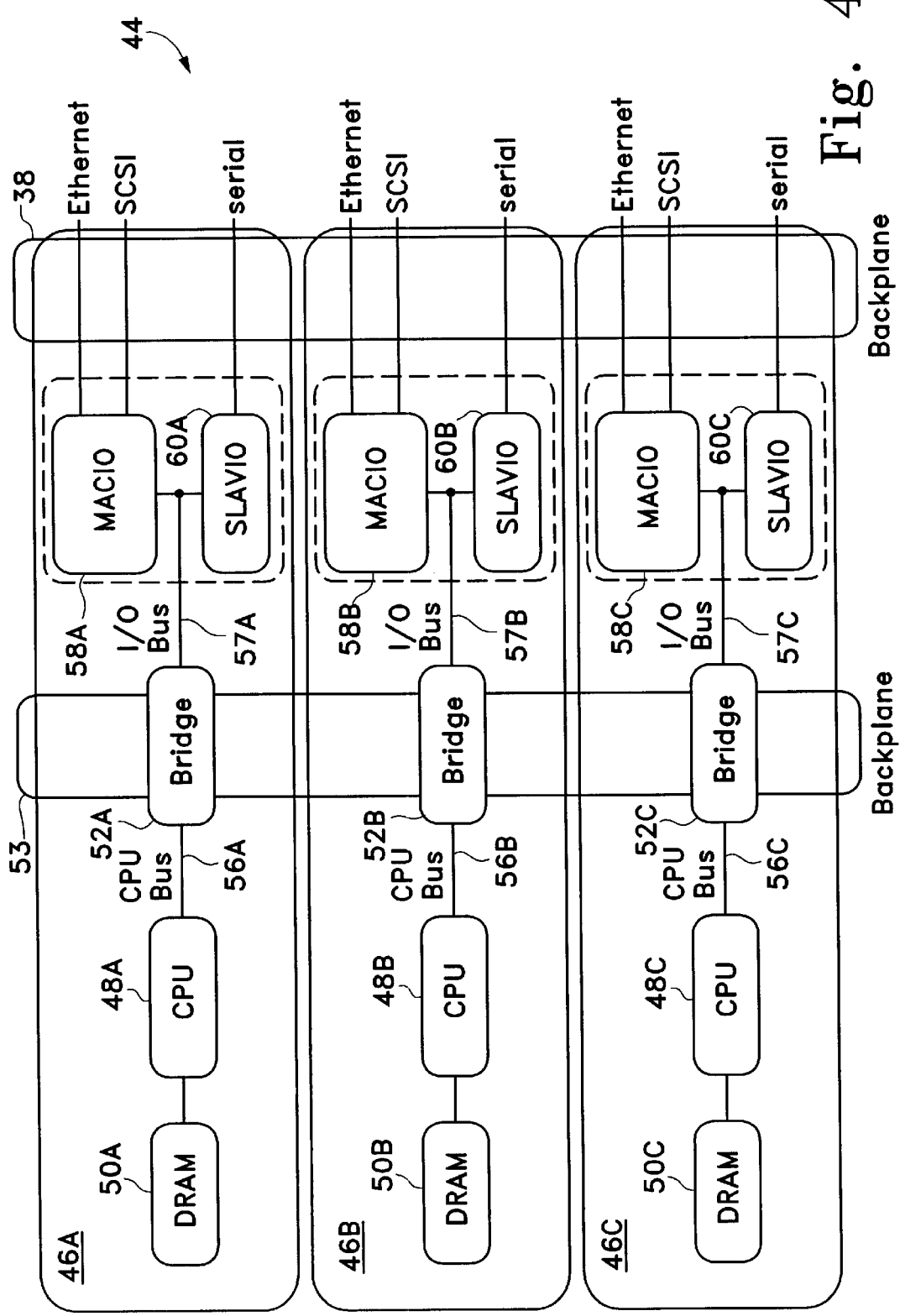
FIG. 4 is a more detailed block diagram of the TMR system of FIG. 3 which generally represents the physical layout of the system and which illustrates isolation of the processor (CPU) bus and the I/O bus on each module.

Referring to the illustrative drawing of FIG. 4, there is shown another view of the TMR computer system 44 showing the layout of the current embodiment. Processor (CPU) 48A is coupled to processor bus 56A. Processor (CPU) 48B is coupled to processor bus 56B. Processor (CPU) 48C is coupled to processor bus 56C. I/O controller 54A (within dashed lines) is coupled to I/O bus 57A. I/O controller 54B (within dashed lines) is coupled to I/O bus 57B. I/O controller 54C (within dashed lines) is coupled to I/O bus 57C.

A bus interface control unit 53 controls the transfer of information between the processor buses 56A, 56B and 56C and the I/O buses 57A, 57B and 57C. The bus interface control unit 53 ensures that the processors 48A, 48B and 48C operate synchronously during information transfers with the I/O buses. That is, the bus interface control unit ensures that the processors perform the same operations in lock-step during normal operation.

In the presently preferred embodiment, the bus interface control unit 53 includes first, second and third bridge logic units 52A, 52B and 52C. Processor bus 56A and I/O bus 57A are coupled to bridge logic unit 52A. Processor bus 56B and I/O bus 57B are coupled to bridge logic unit 52B. Processor bus 56C and I/O bus 57C are coupled to bridge logic unit 52C. The interconnect unit 38 interconnects the individual bridge logic units 52A, 52B, 52C disposed on different modules.

In the present embodiment, each module 46A, 46B, 46C, actually includes two I/O controllers connected to the I/O bus 57A, 57B or 57C disposed on that module. In the current embodiment, these controllers commonly referred to as a "MACIO" 58A, 58B, 58C and a "SLAVIO" 60A, 60B, 60C. The MACIO is an STP2000 produced by Sun Microelectronics of Mountain View, Calif. The MACIO controls SCSI and Ethernet I/O functions. The SLAVIO is an STP2001 available from SunMicro Electronics. The SLAVIO controls Serial I/O, Timers, Interrupts, BootPROM and NVRAM. Note that it is possible that alternative I/O controllers can be used instead of MACIO type and SLAVIO type I/O controllers employed in the preferred embodiment. The bus of each respective module also includes expansion slots (not shown) which permit other I/O controllers, such as network interfaces, to be added to the system. The additional I/O controllers in the expansion slots typically are connected directly to I/O devices, such as network routers.

Each module has access to the I/O controllers of the other modules. More particularly, information transferred to or from one or more I/O devices directly connected to a module via that module's own I/O controllers is sent to neighboring modules via backplane interconnect circuitry 38. Thus, information transacted with I/O devices is shared among the modules. The shared information is compared, as described below, in order to detect possible system faults.

During normal operation, the processors and the processor memory on the three modules operate in clock synchronization. That is, the same operations always are transacted simultaneously on the three processor buses during normal operation. The bridge logic unit of each module compares the information transacted by that module with information transacted by a neighboring module. The unit of comparison is a bus transaction. More specifically, a given block of information that is compared to determine whether there is a fault comprises the data, address and control information transacted during a given bus cycle. The above-described unit of comparison shall be referred to herein as a "transaction". Examples of transactions in accordance with the current embodiment include processor Read, processor Write, DMA Read and DMA Write. Note that different information may be compared for different transactions since different control and data are presented during different transactions.

In operation, the system of the presently preferred embodiment performs three pairwise comparisons. Each such comparison involves a comparison of transaction information from two (a pair) of the three modules. For example, the bridge logic unit of each module receives transaction information from its upstream neighbor module over backplane interconnects, and compares it to its own bus cycle information. For the purposes of the discussion herein, module A is downstream of module B; module B is downstream of module C; and module C is downstream of module A. Conversely, the bridge logic of each module sends its own bus cycle information downstream over backplane interconnects for similar comparison by the downstream bridge logic. If any of the comparisons indicate that the information transacted by any module in the course of a given bus transaction differs from the information transacted over a neighboring module, then the bridge logic detecting the mismatch signals a fault to all three processors. The three processors all evaluate the fault, as explained below, in an effort to diagnose the problem.

In the current embodiment, the bus cycle comparisons involve three pairwise comparisons. The pairwise comparisons are performed using bridge logic units and backplane interconnects, described below, that operate in parallel with (rather than in the path of) the bus control and bus data/address paths disposed on the different modules. That is, the different bridge logic units and the various backplane interconnects of the interconnect unit used to make comparisons generally are not in the path of the different buses and control lines on the different modules. Thus, unlike certain conventional voting schemes, the fault detection logic does not form part of the actual data path. An advantage of the disposition of the fault detection logic generally outside the modules' actual control and data paths is that no additional delay is imposed on the signal path since there is no voting logic in the signal path. Also, there is no voting logic hardware in the signal path that could fail and possibly corrupt the data.

The I/O controllers of the TMR computer system operate independently of each other. They are not synchronized. That is, different operations may be initiated during the same time interval on the three I/O buses. This contrasts with operations on the processor buses which are always identical and synchronized during normal operation. The bridge logic units and the backplane interconnects facilitate fault tolerant operation of the overall system despite the interconnection of synchronous processors and asynchronous I/O controllers and I/O devices.

For example, in order to read data from an I/O device during normal synchronous system operation, all three processors synchronously direct a read request to the I/O controller local to the module that controls the target I/O device. The subject I/O controller responds by reading the requested information from the target I/O device via the bus local to the one particular module. The bridge logic unit and the backplane interconnects cooperate to send the read information to the other two modules. The transaction information incident to the read transaction is subject to pairwise comparisons, and the read information is sent to all three processors. If an error is detected, then each of the three processors runs a diagnostic program to evaluate possible causes of the error.

Conversely, in order to write data to an I/O device during normal synchronous system operation, all three processors synchronously direct a write request to the I/O controller local to the module that controls the target I/O device. The information to be written is actually provided to the I/O controller interface by the processor local to the target I/O device. Thus, although all three processors provide to their respective local buses the same write information, only the processor local to the target I/O device presents the information to the I/O controller interface. The subject I/O controller responds by causing the write information to be written to the target I/O device. In the course of the write operation, the bridge logic unit and the backplane interconnects cooperate to send the write information provided by each processor to the bridge logic units of the neighboring modules. The transaction information incident to the write transaction is subject to pairwise comparisons. If an error is detected, then each of the three processors runs a diagnostic program to evaluate possible causes of the error.

2.0 Clocks and Synchronization 2.1 Clocks Overview

Figure 5A:
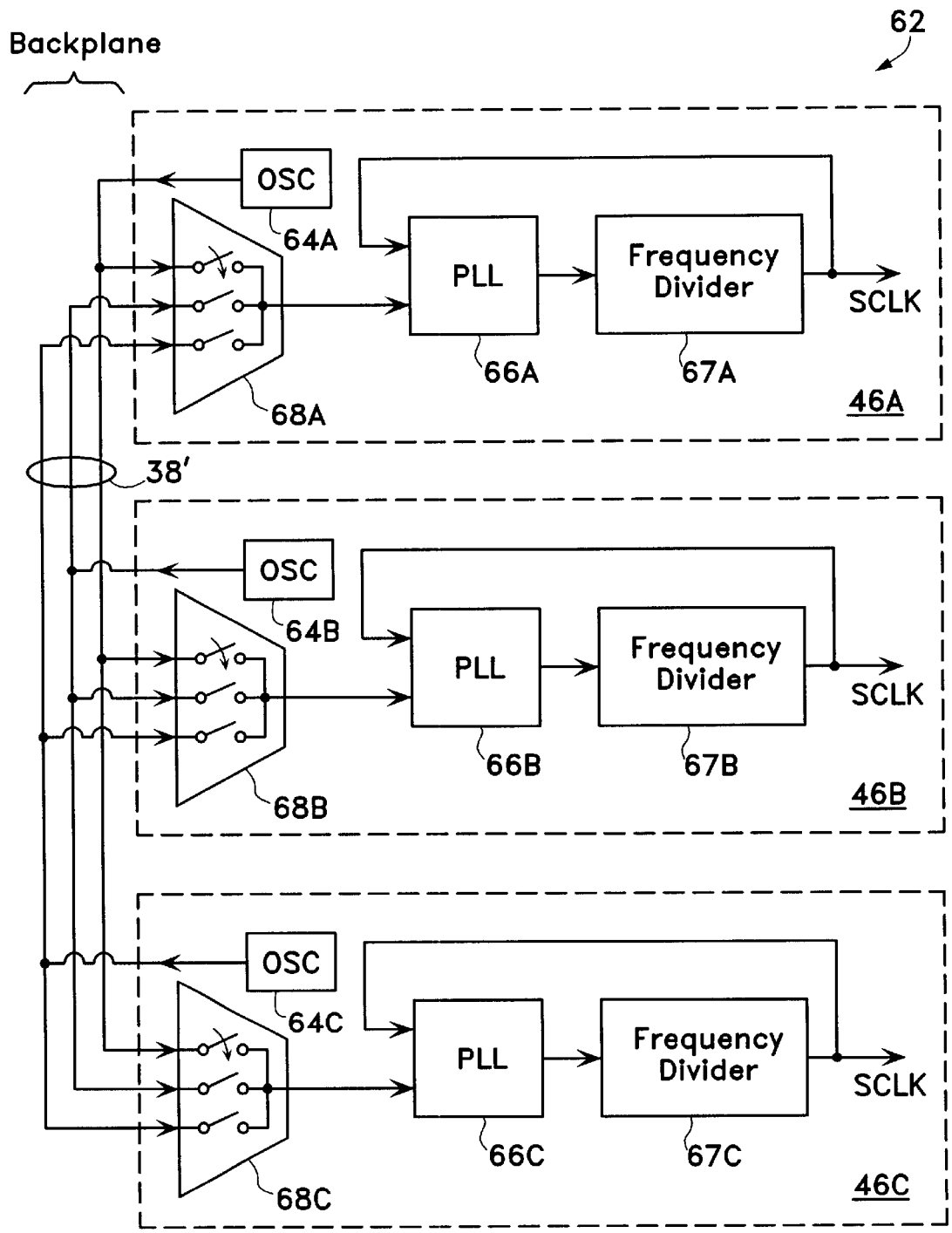
FIG. 5A is a generalized block diagram of a triple redundant system clock employed in the embodiments of FIGS. 3 and 4.

Referring to the illustrative block diagram of FIG. 5A, there is shown a generalized block diagram of a triple redundant clock 62 in accordance with the presently preferred embodiment. The triple redundant clock has components dispersed across the three modules 46A, 46B, 46C. The dispersed components are interconnected via transfer circuitry clock lines 38' which comprise part of the interconnect unit 38. More specifically, each module includes respective reference clock oscillators 64A, 64B, 64C and respective phase-locked loop circuits 66A, 66B, 66C together with respective frequency dividers 67A, 67B and 67C. The reference clocks operate at the frequency of the bus clock. For an SBus, a typical reference clock is nominally 16–25 MHz. Each module's reference clock signal is broadcast over the backplane, via lines 38', to the other modules. On each module, a phase locked loop circuit (PLL) compares a designated one of the received reference clock signals to a local clock signal (SCLK). The local clock (SCLK) signals serve as the bus clock (both as processor bus clock and as I/O bus clock) on modules 46A, 46B and 46C. In the presently preferred embodiment, the PLLs are configured to lock the local SCLK signals to the same frequency as the designated oscillator 64A, 64B or 64C. However, the PLLs can be locked to some multiple of the oscillator frequency without departing from the invention.

Figure 5B:
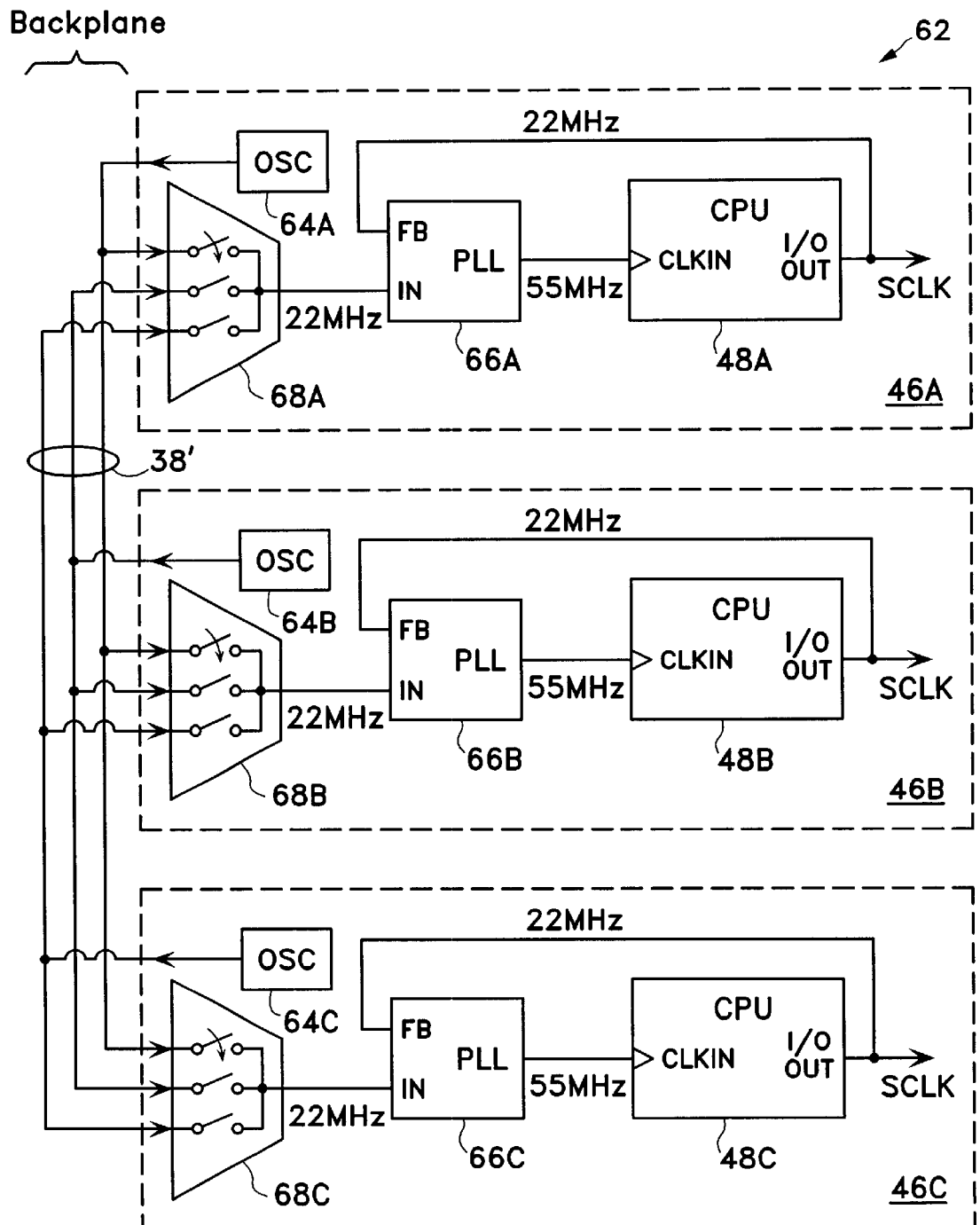
FIG. 5B is a more detailed block diagram of a triple redundant system clock employed in the embodiment of FIGS. 3 and 4 showing respective synchronous processors in respective PLL feedback paths.

More specifically, as illustrated in FIG. 5B, in the presently preferred embodiment respective processors (CPUs) 48A, 48B and 48C are disposed in respective feedback loops with corresponding PLLs 66A, 66B and 66C. The designated reference oscillator 64A, 64B or 64C provides a 22 MHz reference clock signal. The outputs of the respective PLLs 66A, 66B and 66C are provided at 55 MHz to the respective processors 48A, 48B and 48C. Each respective processor 48A, 48B and 48C includes internal circuitry (not shown) which multiplies the received 55 MHz signals to 110 MHz which is the internal processor frequency in the presently preferred embodiment. Internal processor circuitry then divides down the 110 MHz processor clock signal to 22 MHz which is the bus frequency in the present embodiment.

Each processor 48A, 48B and 48C provides its respective 22 MHz signal as feedback to its corresponding PLL 66A, 66B or 66C.

Sychronization of the three PLLs 66A, 66B and 66C is initially achieved through a synchronizing reset operation. At power up, each module initially uses its own local reference oscillator. The modules perform a power-on self-test (POST) routine to ensure that the hardware is functioning properly before synchronizing the modules. The modules employ multiplexer switches 68A, 68B, 68C to select a common reference (by convention, the reference clock from module A, B or C in priority order). This common reference is used by all three modules in the phase-locked loop process described above. That is, each of the PLLs lock onto the common reference, and then perform a synchronizing reset, which is described below after which all three modules are running in synchronization with the selected reference clock source.

A more detailed discussion of the operation of the triple redundant clock 62 is set forth below in section 5.1.

2.2 Synchronization Overview

In order for the three modules to run in clock synchronization, all three should be set to the same initial state, and the inputs to all three modules should be identical (except, of course, in the case of an actual error). Furthermore, it should be possible to replace a faulty module and bring the replacement module into synchronization with the working modules.

Achieving the same initial state can present difficulties. Typically, much of a processor's state can be initialized programmatically, e.g., registers and cache contents. Also, main memory ordinarily can be initialized programmatically. However, some processor state is not accessible to the programmer. For example, the memory refresh counter and the free-running translation lookaside buffer (TLB) replacement counter may not be programmatically accessible. Unfortunately, having these counters out of synchronization may lead to processors being out of synchronization.

Consequently, it is often desirable to apply an external reset to the processors, and release it synchronously, to achieve initial synchronization. Note that some processors, such as the Intel Pentium (TM), support a master/checker mode, which implies that the processors resets to a determinate state.

Alternatively, if the external reset function is not sufficient to achieve a determinate state, a processor's JTAG logic (if present) can be used to initialize the processor as required. Note that resort to JTAG logic is not necessary for the MicroSPARC 2 implementation of the present embodiment.

In addition to starting in the same state, all processors should receive the same inputs. This calls for several synchronizing actions. For example, external interrupts should be synchronized and presented to all processors at the same time. This is accomplished by the bridge logic unit as explained in detail below. DMA requests also should be synchronized. The bridge logic units also accomplish this synchronization, along with other DMA overhead. Processor reads from I/O devices should be stable and deterministic. In order to ensure stability and determinism, relevant signals such as SBus "acknowledge", for instance, are synchronized in the bridge logic units.

When a module is replaced, or otherwise loses synchronization, it should be resynchronized with the remaining modules. For the reasons described above, this is best accomplished via an external reset. To accomplish this transparently to system operation; store the visible state of the synchronized processors in system memory; reset and resynchronize all the processors; and then restore the state of the processors by copying the previously stored state to system memory of the replacement module.

2.3 Overview of Bridge Logic Comparison Operations

The processor buses 56A, 56B and 56C are isolated from their corresponding I/O buses 57A, 57B and 57C. Consequently, fault tolerance strategies may be applied to the processors 48A, 48B and 48C which are different from fault tolerance strategies applied to the I/O controllers 54A, 54B and 54C and I/O devices. More particularly, in the presently preferred embodiment, the fault tolerance strategy applied to the processors involves synchronous processor operation. Whereas, the fault tolerance strategies applied to the I/O controllers and devices involve asynchronous I/O controller operation and asynchronous I/O device operation. Nevertheless, bridge logic comparison operations are employed to identify possible faults arising from (synchronous) processor malfunction and to help identify possible faults arising from (asynchronous) I/O malfunctions. The interconnect circuitry enables the sharing of fault information among processors on the different modules so that they may individually run diagnostic programs to evaluate the fault.

More specifically, the interconnect circuitry interconnects the three modules over the backplane. The current implementation employs an SBus which has a bus transaction with a three clock cycle minimum. The system of the present embodiment takes advantage of this multiple clock cycle bus transaction to pipeline the transfer of the bus cycle information over the backplane, sharing (multiplexing) the same backplane interconnects for address and data.

The interconnect circuitry performs multiple functions. Bridge logic units on each module compare bus transaction information in order to identify possible faults. This comparison is done as three pairwise compares, each module comparing its own transactions information with that of its upstream neighbor. Errors are reported with interrupts and status registers. The interconnect unit also provides access between processors and I/O controllers and devices, and provides access between system memory and I/O controllers and devices. Moreover, the bridge logic units provide a mechanism for exchanging information between modules without requiring a processor local to one module to write to an I/O controller or device local to another module.

If any bridge logic unit detects an error (that is, its local transaction information does not match its upstream neighbors transaction information), it broadcasts an error signal over the backplane to all the bridges logic units. In response, each bridge logic unit latches the transaction information (data, address, control signals) associated with its own transaction as well as that of its upstream neighbor's transaction, and interrupts its local processor.

Alternatively, consistent with the invention, bus transactions can be further serialized to reduce the backplane pin count in future architectures with wider buses, for instance. This can be accomplished, for example, by transmitting the bus cycle information over the backplane at a higher clock rate. To achieve extremely high speed bus information broadcasts, for example, the backplane connections could be implemented as high speed fiber optic connections.

In the present embodiment, each respective, bridge logic unit connects directly to its local bus, and separates the bus into two sections: a processor bus section and an I/O device bus section. In operation during a Read/Write transaction, for example, each processor acting in synchronism with the other processors asserts an address strobe (AS) signal. The AS signal alerts the bridge logic units of the start of a Read/Write transaction. As the Read/Write transaction progresses, each bridge logic unit sends the relevant bus signals (address, data, and control) over the backplane to its downstream neighbor. Simultaneously, each receives the corresponding information from its upstream neighbor, and compares its own local transaction information to that sent by its upstream neighbor. Likewise, each downstream neighbor bridge logic unit compares its own transaction information against that sent by its upstream neighbor.

The module A bridge logic sends a copy of its own transaction information downstream to module C for comparison with the module C transaction information. The module B bridge logic unit sends a copy of its own transaction information downstream to the module A for comparison with the module A transaction information. The module C bridge logic unit sends a copy of its own transaction information downstream to module B for comparison with the module B transaction information.

Note that the transaction information need not be reassembled at the destination bridge logic unit in order to perform comparisons since the destination bus logic unit performs the same serialization with its own bus cycle. Specifically, each bridge logic unit serializes its own transaction information and passes it downstream. Simultaneously, its upstream neighbor does the same. Thus, the comparison logic of any given module has its own serialized version of its own module's transaction information which it sends downstream. This serialized version of its own transaction information is compared with the serialized transaction information received from the given module's upstream neighbor. The comparisons, therefore, are performed on the serialized transaction information.

More specifically, in the present embodiment, the bridge logic unit on each module includes comparator logic for comparing transaction information (data, address and control signals) transacted by its "own" module during a given bus transaction with the transaction information (data, address and control signals) transacted by a neighboring module during the same bus transaction. If the bridge comparator logic on any module detects a mismatch between the transaction information transacted on its own and an upstream neighbor module, then the detecting bridge module stores the bus information (or state) transacted locally with the bus information (or state) transacted by the upstream neighbor module. The detecting bridge logic unit also signals the error to the bridge logic units on the other modules over dedicated backplane connections. The respective bridge logic units interrupt their corresponding processors at the highest priority interrupt level (level 15 in the SPARC architecture). Identical error handler programs in the processors examine the saved transaction information (or state) of the mismatched cycle to diagnose which module is in error.

2.4 Comparator Logic

Figure 6:
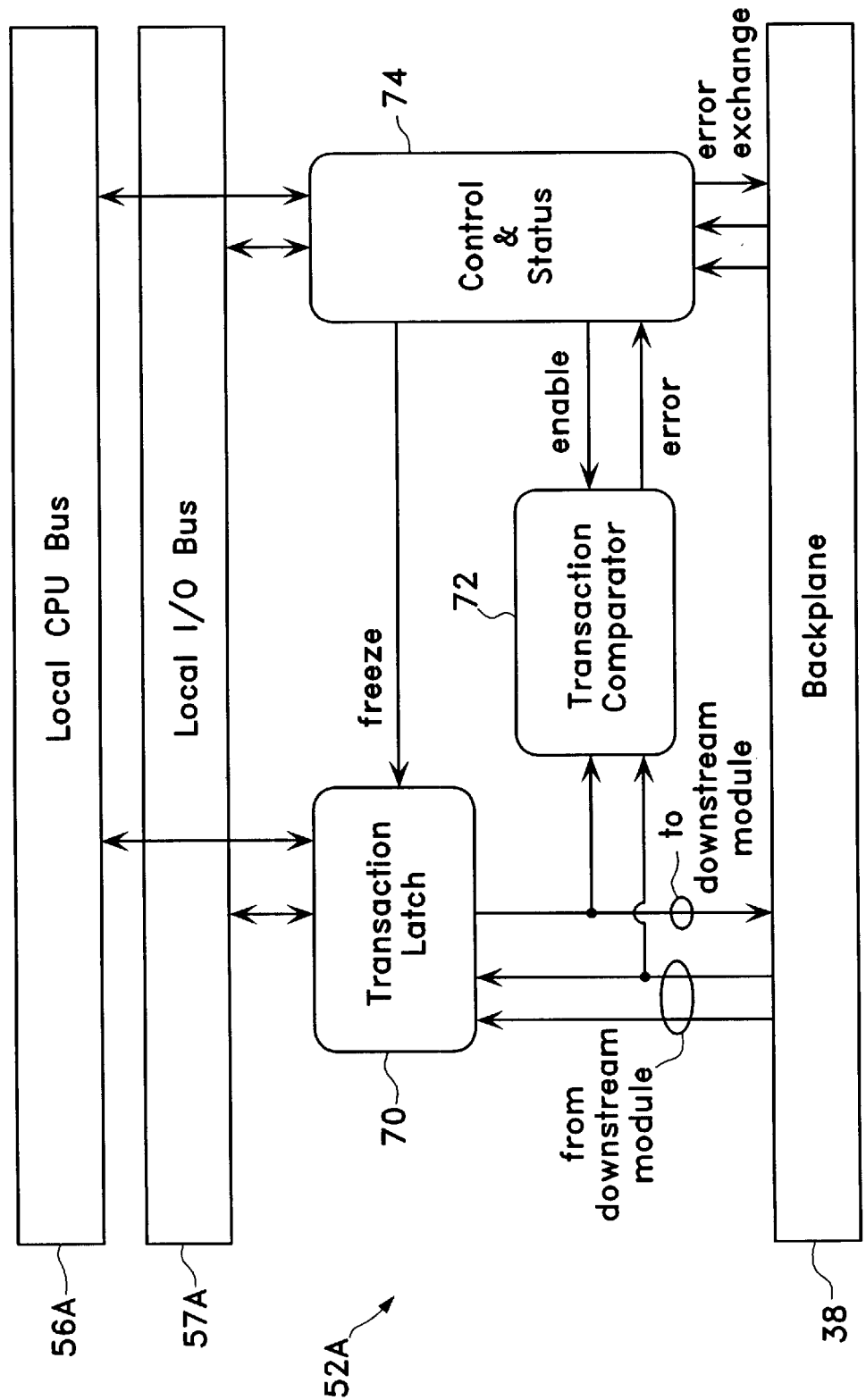
FIG. 6 is a generalized block diagram of a comparator logic portion of a bridge logic unit of one of the modules of the embodiments of FIGS. 3–5.

Referring to FIG. 6 there is shown a generalized block diagram of the comparator logic and transaction latch portions of a bridge logic unit of one of the three modules of the TMR computer system of the present embodiment. In the current embodiment, the local I/O Bus (56) is implemented as an SBus which connects a local processor (not shown) to local I/O devices (not shown). The backplane interconnect unit 38 connects the bridge logic units of the three modules.

The comparator logic portion of each bridge logic unit includes a transaction latch 70 which captures the state (address, data, control) of each I/O bus transaction. Each bridge logic unit sends the captured transaction information over the backplane 38 to its downstream neighbor module.

Conversely, each bridge logic unit receives transaction information that has been captured by its upstream neighbor module and that has been transferred to such unit over the backplane interconnect unit 38. The comparator logic of each bridge logic unit also includes a transaction comparator 72 which compares the local module's transaction information with the transaction information received from the local module's upstream neighbor module.

The comparator logic portion of each bridge logic unit further includes control/status logic 74 which gives software access to the comparator logic portion. For example, under software control, the control/status logic 74 can be instructed to enable or disable comparisons on each module. For instance, comparisons by a given module can be disabled if the given module is diagnosed as faulty.

Errors detected by the transaction comparator 72 of a given bridge logic unit are reported to the control/status logic 74 of the given unit which reports the error over the backplane interconnect unit 38 to the other modules. Likewise, error reports from the other modules are received by the control/status logic 74 over the backplane interconnect unit 38 as shown.

Thus, an error detected by any enabled module is reported to the respective control/status logic 74 of the other modules. The control/status logic on each module instructs its transaction latch 70 to "freeze" (retain) transaction information for the transaction for which an error has been detected. Connections, described more fully below, between each module's local I/O bus 56 and its local transaction latch 70 and its local control/status logic 74 allow the local processor (not shown) to examine the contents of the transaction latch 70 and the results of the faulty comparison for diagnostic purposes.

2.5 Overview of Bridge I/O Sharing

Another function of the bridge logic units is to allow the three processors to share each other's associated I/O devices. In accordance with the current implementation, corresponding I/O devices on the three modules are addressed at different locations in the bus address space. For example, during a processor read, the three processors may synchronously read an I/O device on module B, for instance. The processor 48B on module B actually carries out the read from the module B I/O device. The results of that read (data and acknowledge, in the case of an SBus) are transferred via the backplane to modules A and C and are delivered to processors 48A, 48B and 48C. The bridge logic units on each module perform comparisons to test for errors described above.

During processor writes, although all three processors synchronously request a write, only the local processor actually writes to its local I/O device. That is, only the processor local to the same module as a target I/O device can actually write to that device. An advantage of this arrangement is that a faulty processor cannot corrupt an I/O device on another module.

During a DMA (direct memory access) write to system memory, the DMA data is actually captured by a bridge logic unit buffer memory. The bridge logic unit on each module then performs a DMA write to its local system memory. To guard against renegade DMA devices, each module is restricted (by bridge logic) to its own private region of DMA virtual address space. DMA reads do not require such data buffering.

In the presently preferred embodiment, DMA address space is logically divided into four quadrants, based on two DMA address bits. Each module is restricted to one of the quadrants. One quadrant ordinarily is unused.

It will be appreciated that although the interconnect circuitry permits sharing of I/O information, the I/O controllers and I/O devices local to the three modules are advantageously isolated from each other. For example, the I/O devices and the I/O controller 54B are isolated from modules A and C even though transaction information is shared among modules. This sharing of transaction information facilitates error diagnoses and is necessary in order to pass information from the I/O devices to the processors. Thus, due to this isolation, the failure of an I/O device or an I/O controller associated with (or local to) one module will not corrupt data transacted on the other modules.

2.6 Overview of Bridge Interrupt Synchronization

Interrupts are inherently asynchronous events. Hence synchronization of interrupt operations is necessary before execution of interrupts by the processor buses.

In the present embodiment, respective interrupts for each module are presented by a respective interrupt controller in the form of a four-bit encoded interrupt level (0=no interrupt; 15=highest priority). In the system of the present embodiment, the interrupt controller is resident in the SLAVIO I/O controller which sends the encoded interrupt level to its local bridge logic unit. Thus, each of the three bridge logic units receives an interrupt request level from its respective interrupt controller. In the current embodiment, the interrupt request levels of the three modules are exchanged over the backplane, and the highest priority of the requests is presented to all three processors. An interrupt handler computer program determines which I/O device is interrupting and vectors the interrupt appropriately in a manner which forms no part of the present invention and which will be readily understood by those skilled in the art.

2.7 Overview of Bridge Faulty Module Shutdown Operation

In some cases, a faulty module can potentially disable an entire system. For example, faulty bridge logic might continuously broadcast a highest level interrupt (level 15 in the current implementation). When this situation is recognized, the remaining good modules can disable the faulty module. Disabling is achieved by ignoring the faulty interrupt broadcast (by turning off the corresponding "InSync" bit of an internal register in the respective bridge logic units), or by actively shutting down the faulty module. Each module is built to shut itself down upon the command of any two modules.

3.0 Overview of Bridge Detected Error Diagnosis

After a compare error, the interrupted processors run a computer software implemented diagnostic procedure to determine the source of the error. During normal operation, the diagnostic procedure ordinarily is run by all three modules in synchronization. However, it will be appreciated that a faulty module may have caused the error and may be no longer in sync with the other two modules. System software receives the interrupt and invokes the diagnostic procedure to interpret the transaction information stored in the respective transaction latches of the respective modules in order to determine which module is in error.

In the present embodiment, the transaction information captured by each module is compared by the bridge logic units on two of the three modules. Depending on which module is in error, the combination of miscompares serve to identify the offending module, according to the following table:

| Bad Module | Good Compares | Bad Compares |
|---|---|---|
| A | B:C | A:B, C:A |
| B | C:A | B:C, A:B |
| C | A:B | B:C, C:A |

For example, according to this table, when module B is faulty, and deviates from modules A and C, the resulting mismatching I/O transactions will be detected by the B-to-C comparison, performed by module B and by the A-to-B comparison performed by module A; however, the C-to-A comparison performed by module C will not report an error.

Having identified the offending module, the software may instruct the system operator to remove and replace the module with a good module. When the module has been replaced, the software executes a resynchronization procedure to bring the replaced module into synchronization with the modules already in (synchronous) operation.

3.1 Bridge Detected Error Diagnosis in Detail

The above described pairwise error detection processes are useful in identifying faults. However, further analysis often is required to understand the nature of the fault and to institute appropriate corrective action. In other words, the result of the pairwise analysis may not point unambiguously to one faulty module. A more detailed diagnostic procedure described below is employed to handle such ambiguities in a current implementation of the invention.

For example, for any given error detected through pairwise comparison techniques, the error source location and the error detection location may be on the same module or on different modules. That is, there may be ambiguity as to whether a detected fault is due to a fault on the module that detects the fault or is due to a fault on the module that transferred the transaction information to the module that detects the fault. The nature of these ambiguities and diagnostic processes employed to evaluate them are described below in more detail.

3.2 Error Source

The error is first identified as to the nature of its source. Elements of an I/O transaction being compared can originate independently from all three modules, or from a single module. For example, when the processors read a register from an I/O device on a specific module, the transaction address has three independent sources (the three processors) that should all be identical. The data that is read, however, originates from a single source, the addressed I/O device.

By examining transaction information stored in the transaction latch 70 and the compare error status, the diagnostic software can determine whether the miscompare originated with one module, all three modules, or some combination of the two.

3.3 Error Detection Location

An error is detected by comparison logic on each module that compares I/O transaction information on that module with the corresponding transaction information sent from its upstream neighbor. There are three pairwise comparisons performed, one on each module. The transaction information from each module participates in two of the three comparisons: its own, and that of its downstream neighbor.

Unambiguous errors are detected (as described above) by the comparator on the faulty module itself, and by the comparator on its downstream neighbor. The third comparator, located on the upstream neighbor and comparing the two neighbors, will not detect an error.

3.4 Ambiguous Errors

Certain errors are ambiguous in origin; that is, the faulty module cannot be identified with certainty. There are two primary sources of ambiguity. First, data originating from a single source can cause ambiguous errors if the data appears one way to one recipient of the data and appears another way to another recipient of the data. Possible causes of this error include marginal signal levels or timing.

For example, suppose that a transaction reads from module A, and module A is faulty in such a way that it returns part of the data with a marginal signal level (that is, between the defined high and low levels). The three modules receiving the data can interpret the marginal levels arbitrarily, and the resulting miscompare might point to the wrong module. If module B sees the marginal data as logical 0, and modules A & C see it as logical 1, the resulting compare will superficially identify module B as faulty. But detailed analysis will reveal that the offending data came from a single source, module A, and that it is a fault candidate.

Another possible source of ambiguous errors, for example, is the backplane interconnect unit and bridge logic units. The described hardware cannot distinguish among faulty transmission of a transaction to the backplane, faulty reception from the backplane, or faulty compare logic, for example.

Byzantine resilience theory demonstrates that ambiguous errors are inherent in any triple-redundant system, and that they can be dealt with unambiguously only be having a minimum of four modules and meeting various other requirements. The approach taken in the present embodiment is to recognize the possibility of ambiguity, and deal with it in the software diagnostic process rather than in hardware voting logic.

3.5 Diagnostic Procedure

The strategy employed by the diagnostic procedure of the current embodiment involves analyzing patterns of miscompares. A single miscompare may not necessarily signify an error. Thus, multiple miscompares are evaluated in order to discern a pattern which may suggest which module(s) are suspect. The suspect modules are then "scored", in a manner described below, in order to determine which of the suspect modules is likely to be faulty.

More specifically, the general procedure employed in the current embodiment for diagnosing faults that may be ambiguous is as follows:

a. Determine which modules are reporting a miscompare.
 b. Determine the source of the miscomparing data (all three modules or a single module).
 c. If the miscompared data originates from all three modules, and two modules report the error, treat the error as unambiguous, and label the suspect module in accordance with the pairwise error analysis described above.
 d. If the miscompared data originates from all three modules, and only one module reports the error, treat the reporting module as suspect (a compare logic error). If the data source was faulty then we would expect two modules to report compare errors.
 e. If the miscompared data originates from all three modules, and all three modules report the error, diagnose a common-mode multiple-module failure and mark all three modules as suspect. Reliable operation is not guaranteed in this case.
 f. If the miscompared data originates from one module, and all three modules report the error, diagnose the originating module as suspect.

g. If the miscompared data originates from one module, and only one module reports an error, consider both the originating module and the reporting module as suspect. Note that these may be the same module.

h. If the miscompared data originates from one module, and two modules report the error, consider the originating module and the common-error module as suspect. Note that these may be the same module. The common-error module is the module that the above-described pair-wise error analysis suggests to be in error. The originator of the data is not necessarily in error if there is a miscompare. The error could have occurred in the reporting module.

i. If exactly one module has been marked as suspect, disable it and instruct the operator to replace it.

j. If two or three modules have been marked as suspect, evaluate the probability that each module is faulty. The probability for each module is a combination of the probability of the suspected error mechanism (externally predefined for each error type), modified by whether the module has been suspected but not replaced previously. This evaluation depends upon the nature of the suspected error, forms no part of the present invention and will be readily understood by those skilled in the art, and therefore, need not be described in detail herein.

In general, when a module is suspected but not replaced it becomes a more likely candidate for replacement the next time or times it is suspected.

The above approach aims to resolve another diagnostic ambiguity. In general, when operating with only two modules (such as after the failure of a third module) it is often impossible to identify the faulty module after a miscompare. However, if one of the remaining modules has been a suspect in the past, it can be regarded as the more likely offender in the two-module case.

To illustrate a relatively simple diagnosis, suppose for example, that module B is faulty and writes erroneous data to its local bus. The error will be detected by the bridge logic unit on module B, which will detect a mismatch between its own erroneous transaction information and the error free bus cycle information of upstream module C. The same error will be detected by downstream bridge logic unit A, which compares its own error free bus cycle information with the erroneous transaction information of bridge logic unit B. Bridge logic unit C, which compares its own error free transaction information with that of bridge logic unit A, does not detect an error.

Ambiguous errors are also possible. For instance, errors in the bridge logic itself can be ambiguous. When bridge logic unit A transmits its own transaction information over the backplane to module C, for example, an error in a bridge logic A transmitter is indistinguishable from a corresponding error in a bridge logic C receiver (or comparator). There are alternative ways to handle ambiguous errors. In the case of a permanent bridge logic error, built-in selftest logic in the bridges can be used to determine which module is faulty. If the error diagnosis indicates that one of two modules (A and C) is faulty, but it is unclear which, then swapping the suspect modules may facilitate a correct diagnosis. Swapping can lead to a correct diagnosis because a different pair now will appear to be ambiguously failing. If the transmitter of bridge logic A turns out to be faulty, implicating (ambiguously) C, then when bridge logic A is moved to position C, it will now implicate (ambiguously) module B.

It will be appreciated that the computer program implemented diagnostic analysis described above is intended to provide a detailed framework in which to diagnose a wide variety of potential failures. It is well within the ordinary level of skill in the art to apply this framework to evaluate the myriad of potential points of failure in the computer system of the presently preferred embodiment.

3.6 Byzantine Faults

Certain faults, termed Byzantine faults, require four modules and a different interconnection scheme to be reliably tolerated. An example in the present system is a potential fault when all three modules read from a single source (e.g., an I/O register on one of the modules). The data read from the single source is driven onto the backplane by the target module. If one of the data drivers is faulty, and drives an undefined signal level onto the bus (say between $V_{IH}$ $V_{IL}$), the receiving modules will perceive it as some arbitrary (and possibly different) logic value.

Suppose that the three synchronized processors read a register on module C, which exhibits the described fault, and further suppose that modules B and C see the bit as a logic 1, while module A sees it as a logic 0. The resulting error is detected, but since B and C agree on the value, it appears that A is at fault-even though the real fault lies with C's backplane driver.

The fault diagnosis software running in the processors of the three modules is aware of the possibility of Byzantine faults, and in cases where such a fault is possible, labels both modules A and C (in the example) as potentially faulty. The recovery strategy is ultimately up to the operator, but one possibility is to replace-both A and C while continuing to run with module B.

4.0 I/O Fault Tolerance

In the system of the present embodiment, the I/O fault tolerance strategy is different from the processor fault tolerance strategy. The I/O devices operate asynchronously; different I/O devices may initiate different I/O operations independently of each other. The processors, on the other hand, operate synchronously; during normal operation, all processors simultaneously process the same instructions. Moreover, in the current embodiment, an I/O fault tolerance strategy generally can be separately tailored to each I/O device or subsystem.

4.1 SCSI Disk Subsystem

The basic architecture of the present invention provides three independent SCSI channels-one on each system module. Several levels of fault tolerance can be implemented depending on application requirements.

4.1.1 No Disk Fault Tolerance

The SCSI subsystem can be implemented with no fault tolerance configured at all. This is not ordinarily desirable, since a faulty module would render its associated disks unavailable.

4.1.2 Redundant SCSI Cabling

A disk can be connected to two of the system's SCSI channels by connecting a cable from one module to the disk and thence to a second module, with termination at the modules. In normal system operation, one of the modules acts as the SCSI controller; the other module on the cable is a standby controller and is not active. The third module's SCSI channel is not used. If the first module fails, its duties as SCSI controller are taken over by the standby module.

This configuration protects against module failure, but does not provide any protection against disk drive failure, or against certain kinds of cable failure.

4.1.3 Two-Way Mirroring

In the two-way mirroring configuration, two identical drives are connected to two independent SCSI channels. The data on the two drives is duplicated. All writes are directed to both drives. If one drive fails, the mirror drive is available.

This configuration protects only against disk errors that can be identified by hard failures or check sum errors.

4.1.4 Three-Way Mirroring

Three-way mirroring is an extension of two-way mirroring, but allows for byte-for-byte data comparison on reads. Three-way mirroring provides full fault tolerance for the disk subsystem at a significant cost in drives.

Three-way mirroring exacts a performance penalty, especially when byte-for-byte compares are employed. An advantage of three-way mirroring over RAID, however, is that drive failure does not cause additional performance loss.

4.1.5 Dual-Controller RAID

In this configuration, a third-party RAID box is employed. The RAID box has two controllers, with independent SCSI channels, that are connected to two system modules. The level of data integrity attained is dependent on the kind of RAID employed, but is typically not as high as three-way mirroring. On the other hand, disk capacity efficiency is quite high. Module failures and most controller failures are tolerated.

One disadvantage of RAID in general is that a drive failure can cause a significant loss in performance until the failed drive is replaced and rebuilt.

4.2 Ethernet Subsystem

The currently preferred embodiment provides a system with three independent Ethernet ports. These ports can be employed as three conventional ports, with fault tolerance, if any, being provided by existing IP (Internet Protocol) mechanisms.

Alternatively, a low-level fault tolerant Ethernet mode is available. In this mode, the three ports are programmed to the same Ethernet address. Only one is active at a time; the other two are inactive standby ports. Together, the one active and two standby ports appear to the system software as a single Ethernet port. If the module containing the active port fails, another port is set active.

A daemon process running in synchronization on all three processors is configured to ping one or more remote hosts over the active Ethernet channel. If the ping fails, the daemon commands a switch over from the active port to one of the standby ports. More specifically, the daemon logic rotates the active port through all the available modules even if errors are not found. The ping responses are gathered over time and used to develop a figure of merit for each of the three ports. The figure of merit is used to determine the dwell time for each port in the rotation.

4.3 System Timer

The presently preferred embodiment runs the Solaris operating system which uses a simple timer to cause an interrupt at a 100 Hz rate; this timer is used for timekeeping, process scheduling and other functions. The system of the present embodiment employs three such timers—one per module.

Each of the three timers is programmed to interrupt at the normal rate. Low level software in the timer code synthesizes a virtual timer from the three physical timers in such a way that the failure of any single timer (not interrupting at all, interrupting too fast, or interrupting too slowly) is ignored by the system.

The system timer is described in more detail below in Section 5.2.

5.0 Clock Details

5.1 This is a Brief Description of the TMR Clock of the Presently Preferred Embodiment Generally, a TMR system achieves fault tolerance through triplication; three identical components are provided as back up. The system, therefore, does not depend on the proper operation of any individual component for the overall system to operate properly. The clock, however, poses additional challenges. All three modules employ the same clock, at any given moment, in order to run synchronously. If the clock fails, then the entire system fails.

In order to avoid such a single point of failure, redundant clocks are employed. There can be problems, however, in identifying failure of individual redundant clocks since such failure can be gradual. Moreover, there can be difficulties in selecting an alternative redundant clock in the event of a clock failure. For instance, a simple three-way voting scheme is generally not applicable to clock signals produced by different oscillators because of difficulty controlling the phase and drift of the output of an oscillator. Although complicated three-way clock voting techniques have been designed, they often introduce a variable amount of skew between the modules because of the skew introduced by the voting logic. This skew can be minimized, and possibly brought to within an acceptable range, but it generally cannot be eliminated.

The system of the presently preferred embodiment addresses the problem of clocking a TMR system by providing a clock with "zero" skew between modules, that will keep running independent of a failure on any one module. Moreover, in the present embodiment, the processor and I/O buses employ the same bus clock even though different operations may be simultaneously initiated on the synchronous processor buses, on the one hand, and on individual asynchronous I/O buses on the other hand. As explained below, the bridge logic units coordinate the operation of the synchronous processor buses and the asynchronous I/O buses.

Referring again to FIGS. 5A and 5B, each module has a clock source oscillator 64A, 64B, 64C that it drives out onto the backplane via transfer circuitry lines 38'. Each module takes in the clock source from the other two modules. One clock source is designated or elected as the clock source to be used and is selected by multiplexers 68A, 68B, 68C. The manner in which a clock source is elected is implementation dependent and forms no part of the present invention. The principle requirement is that all three modules elect the same clock source. The designated clock source is fed into a PLL 66A, 66B and 66C on each module. The SCLK signal on each module is used as the bus clock for that module. Importantly, once a PLL 66A, 66B and 66C has locked onto the frequency and phase of the designated clock source, it will remain locked at that frequency and phase for a short while even if the elected clock source changes frequency or phase (e.g., if the elected clock source dies).

Thus, the PLLs 66A, 66B and 66C perform an important role in achieving fault tolerance. If an oscillator (clock) 64A, 64B and 64C fails, the oscillator failure can be readily detected as described below. If the failing oscillator happens to be the oscillator designated as the basis for clocks on all three modules, then another one of the oscillators is designated to replace it. During the time interval between oscillator failure and designation of another oscillator, the PLLs through their inherent "inertia" cause the bus clocks on the modules to continue to run. The clocks might actually drift apart somewhat so synchronization could temporarily be lost, but a resynchronizing reset can be performed to bring everything back in to synchronization. Thus, even though the clocks might drift apart, no module ever loses its clock. The processors can continue functioning and can issue a resynchronizing reset that corrects for any drift. Therefore, there is no deleterious loss of synchronization despite the failure of a designated oscillator. Note that in the event that a PLL fails, the module bearing the failed PLL fails entirely but the other two modules continue to function correctly.

In order to detect the failure of an oscillator (clock) 64A, 64B and 64C, clock comparators (not shown), described below, constantly monitor the clock sources from the three modules. In the presently preferred embodiment, there are three comparators, one on each module. Each comparator does a full comparison between the three oscillators. When a comparator detects that one of the clock sources has failed (i.e., its either running too fast or too slow), it issues an interrupt to the processor so that the software can run diagnostics and take the failed module off-line. If the failed clock source 64A, 64B or 64C is the elected clock source, then the hardware logic will also elect a new clock source. Since the output of the PLLs 66A, 66B and 66C remain locked to the original frequency and phase for awhile even after the original elected clock source fails, the clock (SCLK) on each module temporarily continues running normally despite failure of the designated clock source. The PLLs will gradually shift to the frequency and phase of the newly elected clock source. This gradual shift might slowly bring the three modules out of synchronization. Therefore, a resynchronizing reset is performed when a failure is diagnosed, but still, the overall system will keep running because none of the modules ever actually loses its SCLK clock.

It will be appreciated that PLLs have been used in the past to produce multiple copies of a clock with no skew between the original clock and the multiple produced clocks. Also, PLLs have been used in the past to clean up a clock (i.e., to provide a 50/50 duty cycle or to filter out any occasional noise) without introducing skew; the "inertia" of the PLL permitted it to clean up the clock. The system of the present invention, however, advantageously employs this same "inertia" to temporarily maintain clock operation even if the elected clock source fails. As used herein, the PLL "inertia" refers to the tendency of a PLL circuit to continue to operate at a locked-in frequency for a brief time interval despite removal or alteration of clock source frequency.

If the PLL 66A, 66B and 66C on one of the modules 46A, 46B or 46C ever fails then the clock for that particular module fails. That individual module can no longer function correctly, but the system will continue running. This case is like any other hardware failure on a module; the module fails and should be replaced, but the system keeps running.

The failure of an oscillator 64A, 64B or 64C may occur gradually over time. In order to detect such gradual failure, the clock comparator (not shown) of the presently preferred embodiment comprises three counters, each one clocked by one of the clock sources from the three modules. When any one of the three counters counts up to TCNT (top count, an implementation dependent constant the larger this value, the more sensitive the clock comparator but the longer it takes to detect a failure), the comparator checks to see if the other two counters have at least counted as high as BCNT (bottom count, an implementation dependent constant; this value would typically be TCNT-2).

If they have, then all three clock sources are fine; all three counters are reset; and the counting starts over again. If neither of the other two counters has reached BCNT yet, then the clock source for the counter that reached TCNT is running too fast and is marked as failed. If one of the other counters has reached BCNT but the other one has not, then the clock source for the counter that did not reach BCNT is running too slow and is marked as failed.

For example, if TANT is 100 and BCNT is 98, then the comparator can detect frequency differences of about +/−2% between the three clocks, but it will take 100 clock ticks before a failed clock is detected. If TANT is 10 and BCNT is 8, then the comparator can detect frequency differences of about ±20% between the three clocks, but it will only take 10 clock ticks before a failed clock is detected.

Multiple counters with different values of TANT and BCNT may be used for each clock source, so that small counters can quickly detect drastic frequency changes, and larger counters can eventually detect subtle frequency differences.

Essentially "zero" skew can be achieved because the elected clock source 64A, 64B or 64C only passes through a switch (multiplexers 68A, 68B or 68C which have essentially "zero" skew) and a PLL 66A, 66B or 66C (which have essentially "zero" skew) to generate the clock for each module.

5.2 Reliable Timer

A significant advantage of the architecture of the present embodiment is that it flexibly supports a wide variety of approaches to I/O fault tolerance. This capability is valuable because the nature of I/O demands different approaches for different kinds of I/O (disk, network, etc) and for different applications.

The specific strategies for I/O fault tolerance implemented in the current embodiment are generally well known, using such techniques as failover or mirroring. However, the present implementation does employ certain novel I/O fault tolerance features.

For instance, in a typical non-fault-tolerant workstation computer system, there is a system timer whose function it is to periodically interrupt the system, generally at 60 or 100 times per second, but sometimes at somewhat different rates. The system software uses these interrupts to perform service procedures such as keeping track of time, and scheduling and allocating the resources of the workstation (task switching, for example). The proper functioning of the timer is critical to correct system operation, and a fault tolerant implementation should address (and tolerate) the possibility of timer failure.

5.2.1 Timer Overview

The architecture of the current system implementation, because of its triply-symmetrical nature, provides three hardware timers, one on each module. In the present embodiment, a system timer is provided on each SLAVIO I/O controller. Timer software uses these three hardware timers to synthesize a fault tolerant virtual timer, whose correct operation is guaranteed as long as two of the three hardware timers operate correctly. The third timer can fail in any fashion, including not functioning at all, or interrupting at the wrong rate, either slower or faster than normal.

5.2.2 Timer Description

Using conventional system software running on each of the processors, the processors are scheduled to be interrupted periodically by all three of the hardware timers, nominally at 100 Hz in the example implementation so that appropriate service routines can be executed on the processors.

More specifically, in the current embodiment, all interrupts are broadcast across the backplane and used by all three modules. Interrupts are synchronized and the highest priority interrupt level from the three interrupt controllers is simultaneously passed to each of the three processors. When any hardware timer interrupts, the software running in synchronization on the three processors follows the following process, and determines whether to issue a virtual, fault tolerant, timer event, equivalent to the single timer tick of a non-fault-tolerant system.

Timer operation is basically as follows.
1. Start the three independent timers to interrupt the system software at 100 Hz.

2. When any one timer interrupts, remember that it has interrupted, but otherwise ignore it.
3. When a second timer interrupts, some other timer having already interrupted, treat the second interrupt as a system timer interrupt, and remember that two timers have interrupted.
4. When and if the third timer interrupts, ignore it and reset the memory of the first two timers.
5. Repeat steps 2–4.
6. Count the occurrences of each timer, using the counts to identify a timer that interrupts at a significantly different rate than the other two timers.

The result of this procedure, which is described in more detail below, is that any one timer can exhibit arbitrary behavior, from not interrupting at all to interrupting continuously, without adversely affecting system operation. In addition, a faulty timer is identified and can be disabled through conventional procedures, including, as a last resort, disabling the entire module on which it resides.

A detailed description of the current best mode for implementing a system timer in accordance with the invention is as follows. Two state variables, "pending" and "ignore," are used; each is initialized to 0 at the beginning of system operation. Temporary variable "imask" is also used.

1. Set binary mask variable imask to 0.
2. If hardware timer A is interrupting, add 1 to imask and increment a counter of total interrupts from timer A.
3. If hardware timer B is interrupting, add 2 to imask and increment a counter of total interrupts from timer B.
4. If hardware timer C is interrupting, add 4 to imask and increment a counter of total interrupts from timer C.
5. If imask and ignore have any "on" bits in common, turn those bits off in imask and in ignore. This step prevents a faulty too fast clock from causing the virtual interrupt happening too fast.
6. Set pending to the bitwise logical "OR" of imask and pending.
7. If pending is now equal to 3,5,6 or 7 (that is if two or three of the timers have interrupted), then set ignore to the bitwise Exclusive-OR of pending and the value 7, set pending to 0, and perform the timer service routine.
8. Otherwise, return from the interrupt without a timer tick. (That is if only one of the three timers has interrupted.)
9. From time to time (every 100 ticks in the current implementation), examine the accumulated counters from steps 2–4. If one of the counters differs from the others by more than two ticks, disable the corresponding hardware timer and report the fault to the system operator.

It can be seen that this process results in a fault tolerant timer that tolerates arbitrary faulty behavior on the part of any of the hardware timers.

5.3 Reset Logic

Special reset logic is important in the microSPARC-2 based TMR systems of the presently preferred embodiment because of a peculiarity of the reset logic inside the microSPARC-II (Processor). Clocks are generated inside the Processor by dividing down the Processor master clock. Two of these clocks SCLK (the SBus clock) are selected by the user to be ÷3, ÷4 or ÷5 based on the speed of the Processor, and GCLK (the graphics clock) is fixed at ÷3. The counters used to divide these clocks are never reset. The clock synchronization logic forces SCLK to be synchronous on all three modules, but it cannot do anything with GCLK. Since the divided by counters cannot be reset to a known state, after a board is reset its clocks will be in any one of three states based on the relationship between GCLK and SCLK (i.e., it is possible to control SCLK, but GCLK can be in any of three states). The fundamental problem is that the clock divider circuitry is not reset; therefore, the Processors cannot be brought into a known state which is essential for TMR.

The reset logic corrects for the inability of resetting the clock divider counters by taking advantage of two features put into the microSPARC-2 for reset timing reasons. The first is that no matter what state the Processor is in when it receives a reset, it will begin executing its reset logic state machine. The second is that a few clocks after the reset line goes inactive (the exact number of clocks depends on the relationship between GCLK and SCLK at the end of the reset), the Processor disables all clock outputs for four SCLK ticks by freezing the GCLK divider counter with GCLK high, and holding SCLK high without actually freezing the SCLK divider counter (it cannot freeze the SCLK divider counter because it is clocking its reset logic state machine with SCLK). During these four SCLK ticks, GCLK is frozen in a known state; therefore, the relationship between GCLK and SCLK is in a known state. The reset logic is clocked on SCLK which is tightly synchronized on all three modules. When a synchronizing reset is done, the logic issues a reset pulse that goes inactive synchronously on all three modules. Immediately after this first reset pulse, the relationship between GCLK and SCLK is an unknown state, but when the Processor eventually disables its clocks, the clocks on all the modules are in the same known state. At this time, a second reset pulse is issued synchronously on all three modules. The clock output disable is released synchronously on all the modules when the Processor begins executing its reset logic state machine, and the GCLK divider counter starts counting again, but this time it starts synchronously from a known state on all three modules. The second reset pulse is held long enough to satisfy the reset timing requirements of the system (32 SCLK ticks in the present implementation), then synchronously released on all three modules. All clocks are now in the same state; therefore, the entire system is in a known state and three modules can run synchronously.

6.0 Bridge Logic Data Path Structure and Operation 6.1.1 Bridge Logic Units-In General The bus interface control unit 53 best illustrated in FIG. 4 includes three bridge logic units 52A, 52B, and 52C, each associated with a different one of the system modules 46A, 46B and 46C. Each of the bridge logic units include circuitry: to control the transfer of transaction information among modules; to perform the pairwise comparisons; to temporarily store transaction information for use in diagnostic analysis; and to coordinate communication between the synchronous (during normal operation) processors and the asynchronous I/O controllers and I/O devices, such that the processors operate in lock-step while the I/O devices operate independently.

In the present embodiment, transaction information includes data, address and control signals that pertain to a given transaction such as a BPIO Read, BPIO Write, Processor Read, Processor Write, DMA Read or DMA Write.

The transfer of transaction information by any given bridge logic unit involves sending transaction information to a downstream module for comparison; receiving transaction information from an upstream module for comparison; receiving Processor Read data from other modules; and receiving DMA Write transaction information from other modules.

The pairwise comparisons, involve comparisons of transaction information. Thus, in the current embodiment, the combination of control, address and data signals transacted by module 46A, for any given transaction, is compared with the corresponding combination of signals transacted by module 46B. Similarly, the transaction information transacted by module 46B is compared with the transaction information transacted by module 46C. Likewise, the transaction information transacted by module 46C is compared with the transaction information transacted by module 46A.

The coordination of communication between the synchronous processors and the asynchronous I/O controllers and I/O devices is an important aspect of the invention. As best illustrated in FIG. 4, each processor module 46A, 46B and 46C includes both a processor bus 56A, 56B and 56C and an I/O bus 57A, 57B and 57C. In essence, the bridge logic units 52A, 52B and 52C operate as bus interface units between respective processor buses and I/O buses. The bridge logic units 52A, 52B and 52C coordinate the communication of information between the processors 48A, 48B and 48C, coupled to the processor buses 56A, 56B and 56C, and the I/O controllers 54A, 54B and 54C and I/O devices (not shown) coupled to the I/O buses 57A, 57B and 57C.

More specifically, bridge logic unit 52A operates as a bus interface unit between processor bus 56A and I/O buses 57A, 57B and 57C. Bridge logic unit 52B operates as a bus interface unit between processor 56B and I/O buses 57A, 57B and 57C. Bridge logic unit 52C operates as a bus interface unit between processor 56C and I/O buses 57A, 57B and 57C.

The bridge logic units 52A, 52B and 52C include transfer circuitry 38 which transfers transaction information between the system modules 46A, 46B and 46C for comparison. In particular, in the present embodiment, first transaction information (data, address and control) involved in transfers across the first processor bus 56A is transferred to the third bridge logic unit 52C for comparison with corresponding third transaction information. Similarly, second transaction information (data, address and control) involved in transfers across the second processor bus 56B is transferred to the first bridge logic unit 52A for corresponding first transaction information. Likewise, third transaction information (data, address and control) involved in transfers across the third processor bus 56C is transferred to the second bridge logic unit 52B for comparison with the second transaction information.

Figure 7:
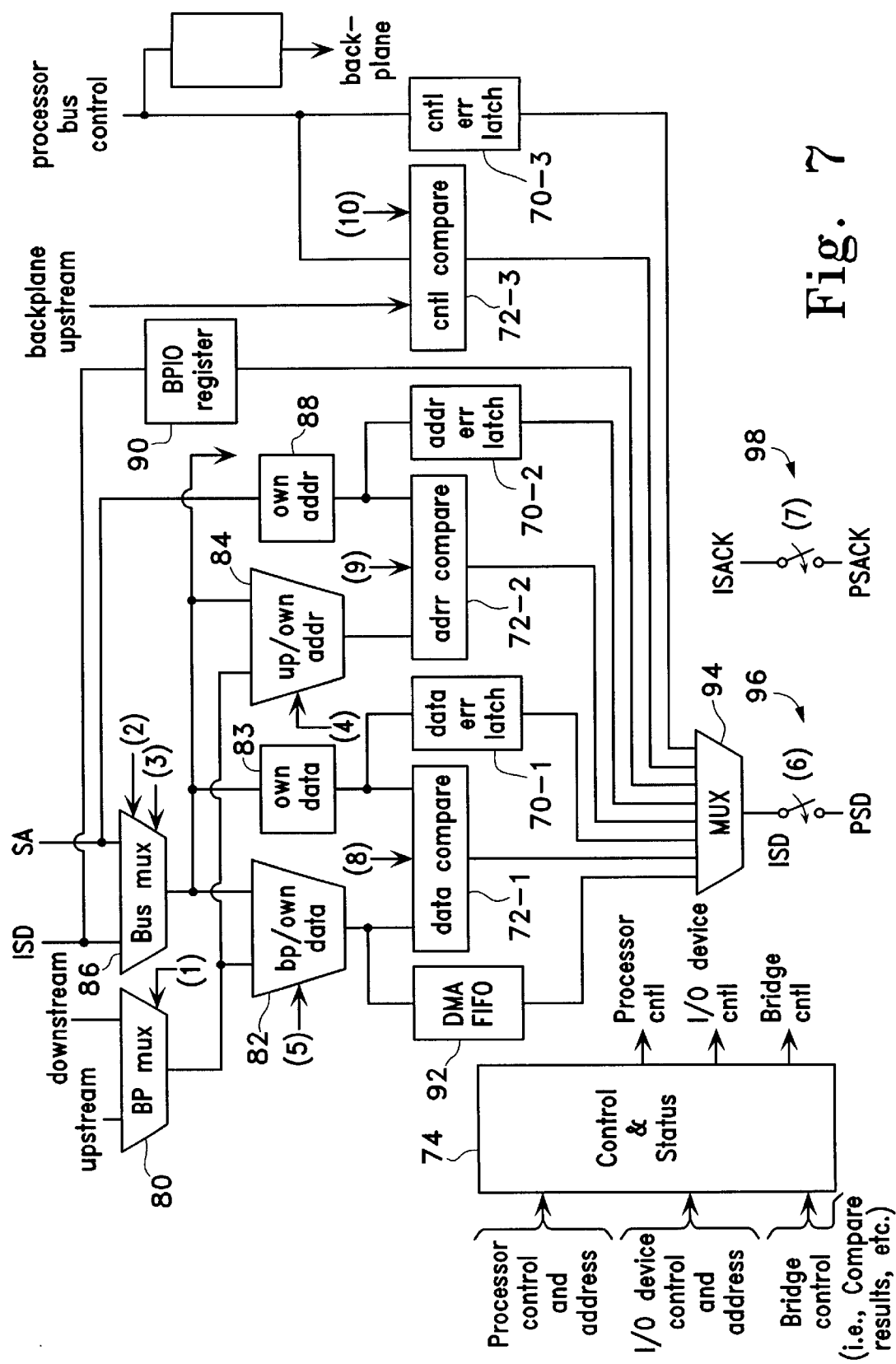
FIG. 7 is a more detailed block diagram of a bridge logic unit of one of the modules of the embodiments of FIGS. 3–5.

The generalized block diagram of FIG. 6 illustrates some of the major components of a representative one of the bridge logic units 52A which comprises: a comparator 72, transaction latch 70 and control and status logic 74. The illustrative block diagram of FIG. 7 shows further details of these components and shows details of the data, address and control flow paths of the representative bridge logic unit 52A of the presently preferred embodiment. As shown in the more generalized views of FIGS. 3 and 4, there are respective identical bridge logic units 52A, 52B and 52C local to each module. In the current embodiment, the bridge logic units are an integrated component of the backplane interconnect unit.

Referring to FIG. 6, the control and status block 74 receives processor-originated control and address signals as input from the processor bus 56A and also receives I/O controller/device-originated control and address signals as input from the I/O bus 57A. The control and status block 74 outputs processor-directed control signals as output to the processor bus 56A and also outputs I/O controller/device-directed control signals as output to the I/O bus 57A and also provides bridge logic-directed control signals as output to the transaction latch 70 and to the transaction comparator 72.

The transaction latches (only the latch 70 of one module shown) temporarily store the transaction information so that it can be provided to corresponding processors for diagnostic analysis in the event that the pair-wise comparison process detects a possible error.

The transaction latches also perform an important role in isolating the independently operating I/O buses from the synchronously operating processor buses during certain bus transactions. More specifically, transaction data and transaction address information may be temporarily stored in transaction latches as control and status circuitry in each bridge logic unit coordinates the interaction of the processor and I/O buses. Thus, the transaction latches on each bridge logic unit in effect comprise a portion of the bus signal path between corresponding processor buses and I/O buses during certain bus transactions.

For instance, as explained more fully below in Section 6.7, during a processor read transaction, all three processors simultaneously request a read from the same target I/O device. However, that target I/O device is local to only one of the three modules. Hence, the transaction latch of the bus logic unit on-the module local to the target I/O device temporarily holds the data read from the target I/O device while that data is transferred via the transfer circuitry to the transaction latches of the bus logic units on the other modules. When the data from the target I/O device has been received by all three bridge logic units, it then can be synchronously provided to the three processors.

In contrast, as explained more fully below in section 6.8, during a processor write transaction, all three processors simultaneously request a write to the same target I/O device. However, that target I/O device is local to only one of the three modules. In the presently preferred embodiment of the invention, only the processor local to the target I/O device actually writes to the target I/O device. Thus, there is no need to temporarily hold transaction information in a transaction latch except for diagnostic purposes. Thus, in the current embodiment, during a processor write operation, the switch 96 on the target module is closed directly connecting the processor bus and the I/O bus.

Moreover, as explained more fully below in section 6.9, during a DMA Read transaction, an I/O device local to one module requests a read from processor memory. In the presently preferred embodiment of the invention, only the processor local to the I/O device requesting the DMA read actually provides local memory data to the requesting I/O device. Thus, there is no need to hold transaction information in a transaction latch except for diagnostic purposes. Thus, in the current embodiment, during a DMA read operation, the switch 96 on the module with the requesting I/O device is closed.

In contrast, as explained more filly below in section 6.10, during a DMA write transaction, an I/O device local to one module requests a write to processor memory. The I/O device initiating the DMA write is local to only one of the three modules. Hence, the transaction latch temporarily holds the data to be written to the processors while the write data is transferred to the bridge logic units on the other modules. When the data to be written by the initiating I/O device has been received by all three bridge logic units, then it can be synchronously provided to the three processors. It will be appreciated that, in the current embodiment, a FIFO is employed to temporarily store data during DMA write operations.

6.1.2 Bridge Logic Units-In Detail

The components of the representative bridge logic unit now will be described in detail.

Referring to FIG. 7, the data portion of the local processor bus 56A is labelled "PSD". The data portion of the local I/O bus 57 is labelled "ISD". Address signals are provided via the "SA" bus lines. There is only one SA bus on the local bridge logic unit 52A, and it is common to both the local processor bus 56A and to the local I/O bus 57A.

Referring back to FIGS. 3 and 4, during normal TMR system operation, all processors 48A, 48B and 48C operate synchronously. That is, the same operations are performed on all three processor buses at all times during normal operation. Data provided by the respective processors 48A, 48B and 48C is transferred over their respective PSD lines on all three modules 46A, 46B and 46C. Referring to FIGS. 2 and 7, when the processors are driving PSD in this manner, it can be shorted (or connected) to ISD via switch 96. In this manner the data on PSD can enter the bus multiplexer 86 via ISD. The I/O buses of the three modules are isolated from each other and from their corresponding processor buses and operate asynchronously (independently). That is, different operations may be initiated at about the same time on the different I/O buses.

In the present embodiment, only ISD is connected directly to the bridge logic and PSD can be selectively connected via a switch 96. Generally, when an I/O device on a given module is supplying data, it goes through the bridge local to that module and across the backplane to the other bridges before it can be driven onto PSD. While the data is going from an I/O device to the three bridges via ISD and the backplane, switch 96 is open, isolating PSD and ISD. However, when the three bridges drive the data to the three processors via PSD, the switch 96 is closed, connecting PSD and ISD.

A backplane (BP) muliplexer 80 receives digital information from upstream and downstream modules; selects between information from an upstream module and information from a downstream module; and provides the selected information to the backplane/own data multiplexer 82 and to the up/own address multiplexer 84. An up/down selection control signal UDISEL (1) controls the BP multiplexer 80 selection of upstream or downstream information. It will be appreciated that the information received by the BP multiplexer 80 may be comprised of data information or address information transferred from an upstream module or from a downstream module.

A bus multiplexer 86 receives data signals (ISD) and address signals (SA) from the bus. As explained above, there is only one SA bus, and it is common to both the processor and I/O buses. It is driven by the local processor 48A. The multiplexer selects between the ISD and SA signals; and provides the selected signals to the BP/own data multiplexer 82, to the "own" (or local) data storage unit 83 and to the up/own address multiplexer 84. The BP/own data multiplexer 82 selects between data signals provided over the backplane via BP multiplexer 80 and data signals provided via the bus multiplexer 86 by the module's "own" (or local) I/O bus. The "own" data storage unit 83 stores data provided via the bus multiplexer by the module's own (local) bus. It will be appreciated that the "own" data storage unit 83 is part of the transaction latch 70 of FIG. 6. The up/own address multiplexer 84 selects between address signals provided over the backplane via BP multiplexer 80 and address signals provided via the bus multiplexer 86 by the module's own (or local) SA bus. The selections by the bus multiplexer 86 are controlled by the ISASEL (2) signal and by the ISDSEL (3) signal.

The own (or local) address storage unit 88 receives input from the module's own (or local) bus address SA lines. The BPIO register 90 receives input from the ISD lines.

Signal selection by the BP/own data multiplexer 82 is controlled by the OBPSEL (5) control signal. Signal selection by the up/own address multiplexer 84 is controlled by the ISASELP1 (4) control signal.

The BPIO registers can be used to temporarily store data and to pass such stored data between the modules. The BPIO registers are not a part of the transaction latch, and they are only written to when software controlled processes write to them. Such software controlled processes, for example, might be used during diagnostic operations. In contrast, the own data storage unit 83 is part of the bridge pipeline. It holds data before it goes into the data compare 72-1. It loads data from the bus multiplexer 86 automatically. Address information passes through unit 83 but does not get used. Storage unit 88 is used to store the address and feed to the address comparator 72-2.

The transaction latch 70 of FIG. 6 includes three storage regions illustrated in FIG. 7. A transaction data error storage 70-1 receives input from the own data storage 83. This latch stores the data information when there is a miscompare (i.e., error). The address error transaction storage 70-2 receives input from the own address storage 88. This latch stores address information when there is a miscompare. A control error storage 70-3 receives input from the processor bus control lines. This latch stores control information when there is a miscompare. It will be appreciated that, even though it is the ISD that is directly connected to the bridge logic unit, processor bus signals are compared since they are the ones that are synchronized. Accordingly, the processor control lines are connected to the bridge logic units so that processor control signals can be compared. The data information in storage 70-1, the address information in storage 70-2 and the control information in storage 70-3, collectively comprise transaction information which can be employed to diagnose error conditions.

The transaction comparison logic 72 of FIG. 6 performs comparisons on three signals. The comparison logic 72 of FIG. 6 comprises three units: data compare 72-1, address compare 72-2 and control compare 72-3. The data compare unit 72-1 compares data signals provide by data multiplexer 82 with data signals provided by the data storage unit 83. Note that multiplexer 82 serves two purposes: to get backplane data to 72-1; and to get backplane or own data to the DMA FIFO 92. When data is going into FIFO 92 it is not compared by 72-1. The data compare is controlled by DVALID (8). An address compare unit 72-2 compares address signals provided by the address multiplexer 84 with address signals provided by the address storage 88. Note that address storage unit 88 stores the address at the start of the transaction at which point it is compared to the upstream address. After this first comparison, multiplexer 84 selects the own (local) address instead of the upstream address. During a typical SBus transaction the address should not change. If it does change, then there is a failure. By comparing the stored copy of the own address at the start of the transaction (88) to the current address on the local bus (SA) a change in the address provided on a module can be detected without having to constantly drive the address out over the backplane. This permits multiplexing of address and data thereby greatly reducing the number of backplane interconnects needed. The address compare is controlled by AVALID (9). A control compare unit 72-3 compares control signals provided by an upstream module via the backplane interconnect unit with control signals provided by the processor bus control signals produced on the local processor bus.

A DMA FIFO 92 receives input from the BP/own data multiplexer 82. The role of the FIFO 92 can be explained briefly as follows. During a DMA write, data provided by a single I/O device is broadcast across the backplane 38 to the respective bridge logic unit on each module and is stored temporarily in the respective DMA FIFOs 92 (only one shown) on the different bridge logic units before being sent to the respective processors. This intermediate storage in FIFOs is employed in the current embodiment, in part, because of the manner in which acknowledge signals are employed in the SBus protocol. A "master" supplying data on a DMA transfer must be able to constantly supply the data, word after word, on each consecutive clock tick. During a DMA transfer the bridge logic unit is the bus master on the processor bus. In order for the bridge logic unit to be able to constantly provide data to the processor, the data is first be stored up in a FIFO and then driven onto the processor bus.

Another reason for the use of a FIFO in the current embodiment is the manner in which backplane transaction data broadcast between the modules is multiplexed with transaction information transferred to a downstream neighbor for pairwise comparisons. It will be appreciated that in the presently preferred embodiment, broadcast data and comparison data cannot be provided on the backplane at the same time. Consequently, data cannot be broadcast from an I/O device while data is being sent to the processor. So, a DMA write is broken into two cycles: one that broadcasts the data, and the other that transfers the data to the processor and to the downstream neighbor for comparison. Thus, in the current embodiment, data is loaded into the FIFO in the first cycle, and then is subsequently transferred out of the FIFO to the processor in the second cycle.

Signal selection circuitry 94 receives input from the DMA FIFO 92, the data comparison logic 70-1, 70-2, 70-3 and from the error storage 72-1, 72-2, 72-3. The signal selection circuitry selects which signals to provide from the bridge logic unit to the ISD/PSD. PSD can be shorted (connected) to ISD via switch 96. When PSD and ISD are connected, the data passes from the bridge logic unit to PSD via the switch 96 and ISD. This is the case for a DMA write (i.e., when the FIFO is used), for example.

Thus, switch 96 (and switch 98) contribute to the isolation of the local processor data bus (PSD) from the local I/O data bus (ISD). Switch 96 operates under control of SWDCLS (6). Switch 98 operates under control of SWACLS (7).

The control and status block 74 receives as input local processor control and address signals and receives as input I/O device control and address signals. The control and status block 74 provides as output processor control signals, I/O device control signals and bridge logic unit control signals. For the processor bus, the control and address signals should be the same on the three modules because the processors are synchronous. The I/O signals, however, are isolated and independent. Therefore, block 74 receives the I/O signals from each module, not just the local one.

A more detailed description of the control signals input to and output from the control and status block 74 is provided in the following charts. Subsequent sections of this application provide a more detailed explanation of the operation of the bridge logic unit during BPIO Read/Write, processor Read/Write and DMA Read/Write.

6.1.3 Control and Status Between CPU and Bridge (PSBus)

| Signal | Transaction | Source | Destination | Description |
|---|---|---|---|---|
| PSAS | CPU R/W | CPU | Bridge | Indicates when there is a CPU initiated transaction. |
| | DMA R/W | CPU | Bridge | Since all DMA transactions are between an I/O device and CPU memory, PSAS does not have to be asserted during DMA. The microSPARC-II, however, does assert it. It is not used by the Bridge. |
| SA | CPU R/W | CPU | Bridge | High-order address bits are used by the Bridge to select the special feature addressing modes (e.g., data compare/no compare, suppress error acknowledges, etc. |
| | DMA R/W | CPU | Bridge | Like PSAS, the address lines do not have to be driven during a DMA transaction. The microSPARC-II does actually drive SA, but it does not get used or compared by the Bridge. |
| PSSLV | CPU R/W | CPU | Bridge | Same as SA. |
| | DMA R/W | CPU | Bridge | Not driven during DMA because the target of a DMA transaction is always CPU memory in our implementation. |
| PSRD | CPU R/W | CPU | Bridge | Indicates the direction of data, PSD, between the CPU and Bridge. |
| | DMA R/W | Bridge | CPU | Indicates the direction of data, PSD, between the CPU and Bridge. Driven by the Bridge after it receives PSBG from the CPU until the end of the transaction. |
| PSSIZ | CPU R/W | CPU | Bridge | Indicates the size of a transaction. |
| | DMA R/W | Bridge | CPU | Indicates the size of a transaction. |
| PSACK | CPU R | Bridge | CPU | Indicates the Bridge has received data from the corresponding I/O device and is ready to transfer it to the CPU. The Bridge drives out the data on PSD one clock after issuing PSACK. |
| | CPU W | Bridge | CPU | Indicates the corresponding I/O device has acknowledged receipt of the data. The data passed from the CPU data bus, PSD, to the I/O device data bus, ISD, via a switch in the Bridge. The data is written when the I/O device issues ISACK. ISACK is broadcast over the backplane, and passed to the CPU as PSACK. |
| | DMA R | CPU | Bridge | Indicates the CPU will drive out data onto PSD on the next clock. The data passes from PSD to ISD via a switch |
| | DMA W | CPU | Bridge | Indicates the CPU has received the data currently on PSD. This signals the Bridge to output the next word of data in the transfer if there is any more data in that burst. |
| PSBR | DMA R | Bridge | CPU | Requests for the Bridge to become the master of the |

6.1.3 Control and Status Between CPU and Bridge (PSBus)

| Signal | Transaction | Source | Destination | Description |
|---|---|---|---|---|
| | DMA W | Bridge | CPU | PSBus. Asserted when the Bridge has determined that the I/O device that is the master of the ISBus is doing a read. Requests for the Bridge to become the master of the PSBus. Asserted after the Bridge has received all the data for the transaction from the I/O device via ISD and has stored it in the DMA FIFO. |
| PSBG | DMA R/W | CPU | Bridge | Indicates that the CPU is letting the Bridge become the bus master. After receiving PSBG, the Bridge must drive out the virtual address of the DMA transfer on PSD, and the bus master control signals, PSRD and PSSIZ. |

6.1.4 Control and Status Between Bridge and I/O Devices (ISBus)

| Signal | Transaction | Source | Destination | Description |
|---|---|---|---|---|
| ISAS | CPU R/W | Bridge | I/O Device | Indicates when there is a CPU initiated transaction targeted at a local I/O device. |
| ISSLV | CPU R/W | Bridge | I/O Device | Each I/O device has a unique slave select line that is asserted by the Bridge from the start until the end of a CPU initiated transaction with the corresponding I/O device. It is derived from PSSLV and high order address bits. |
| ISRD | CPU R/W | Bridge | I/O Device | Indicates the direction of data between the Bridge and I/O device. Driven by the Bridge based on PSRD from the CPU. On a CPU read, the data is received from the local I/O device via ISD, or from an upstream or downstream I/O device via UDBP. |
| | DMA R/W | I/O Device | Bridge | Indicates the direction of data, ISD, between the Bridge and I/O device. Driven by the I/O device after it receives its corresponding ISBus grant from the Bridge until the Bridge takes away the ISBus grant when the I/O device has finished with the transaction. |
| PSSIZ | CPU R/W | Bridge | I/O Device | Indicates the size of a transaction. |
| | DMA R/W | I/O Device | Bridge | Indicates the size of a transaction. |
| ISACK | CPU R | I/O Device | Bridge | Indicates the I/O device is ready to transfer data to the Bridge. The I/O device drives out the data on ISD one clock after issuing ISACK. It is received by the local Bridge via ISD, and is received by the upstream and downstream Bridges via UDBP. |
| | CPU W | I/O Device | Bridge | Indicates the corresponding I/O device has acknowledge receipt of the data. The data passed from the CPU data bus, PSD, to the I/O device data bus, ISD, via a switch in the Bridge. The data is written when the I/O device issues ISACK. ISACK is broadcast over the backplane, and passed to the CPU as PSACK. |
| | DMA R | Bridge | I/O Device | Indicates the CPU will drive out data onto PSD on the next clock. The data passes from PSD to ISD via a switch. |
| | DMA W | Bridge | I/O Device | Indicates the Bridge has received the data currently on ISD if the I/O device is local, or will receive the data on UDBP if the I/O device is on the upstream or downstream neighbor. This signal's the I/O device to output the next word of data in the transfer if there is any more data in that burst. The data is transferred into the DMA FIFO of the Bridge. |
| ISBR | DMA R/W | I/O Device | Bridge | Requests for an I/O device to become the master of the ISBus. Each I/O device has a unique ISBR that goes to all the Bridges. |
| ISBG | DMA R/W | Bridge | I/O Device | Indicates that the Bridge is letting the I/O device become the master of the ISBus. After receiving ISBG, the I/O device must drive out the virtual address of the DMA transfer on ISD, and the bus master control signals, ISRD and ISSIZ. This information is broadcast over the backplane to all the modules. |

6.1.5 Control and Status Within a Bridge Logic Unit

| Signal | Transaction | Destination | Description |
|---|---|---|---|
| UDISEL | CPU R | BP mux | UDISEL selects whether upstream or downstream backplane data is received on UDBP. During the comparison phase of a transaction, backplane information is always received from the upstream neighbor. Initially the physical address is driven onto the backplane by all the Bridges for comparison, and is received by each Bridge from its upstream neighbor. Next, after determining which module has the target I/O device, backplane data is received from that module, upstream or downstream, until an acknowledge |

-continued 6.1.5 Control and Status Within a Bridge Logic Unit

| Signal | Transaction | Destination | Description |
|---|---|---|---|
| | CPU W | | is received from that I/O device. After the read data has been broadcast across the backplane and received by all the Bridges, the data is transferred to the CPU and also driven onto the backplane for comparison. The data on the backplane is received by each module from its upstream neighbor for comparison. Information is only received on UDBP for comparison purposes; therefore, the upstream neighbor is always selected. Initially the address is driven onto the backplane by all the Bridges for comparison, and is received by each Bridge from its upstream neighbor. Next, the write data from the CPU is continuously driven onto the backplane by all the Bridges for comparison, and is received by each Bridge from its upstream neighbor. |
| | DMA R | | Initially, the virtual address is broadcast across the backplane by the Bridge local to the I/O device that is doing the DMA. This information is received via UDBP from that module, by its upstream and downstream neighbor. Next, the read data is output by the CPU on each module and driven onto the backplane for comparison. Data is received on each module from its upstream neighbor. |
| | DMA W | | Initially, the virtual address is broadcast across the backplane by the Bridge local to the I/O device that is doing the DMA. This information is received via UDBP from that module, by its upstream and downstream neighbor. Next, the write data is output by the I/O device and broadcast across the backplane. Likewise, this data is received via UDBP from that module. Once all the data has been transferred across the backplane to the Bridges, the virtual address followed by the data is transferred to the CPU and driven onto the backplane for comparison. Each item is received from the upstream neighbor on UDBP for comparison. |
| ISASEL, ISDSEL | | SBus mux | To reduce the number of interconnect pins between the modules, the physical address and data are multiplexed across a single bus for each module on the backplane. ISASEL drives the physical address onto the backplane, and ISDSEL drives the data onto the backplane. Basically, they are the inverse of each other except that in our implementation, there is a turn around period in which neither address nor data is driven out when switching between address and data. |
| | CPU R/W | | ISASEL is only active for one clock tick at the start of the transaction. Then ISDSEL is active. |
| | DMA R/W | | The physical address is never driven onto the backplane. ISDSEL is always active. |
| ISASELP1 | | up/own addr | During CPU initiated transactions, initially, the physical address is given onto the backplane by each Bridge, and received by each Bridge from its upstream neighbor via UDBP. The initial value of local SA is also latched in "own addr." The initial upstream address is compared to the latched initial local address. In subsequent cycles of the transaction the latched local SA is compared to the current value of SA. In other words, the address comparator (i.e., "addr compare") compares the initial value of SA latched in "own addr" with the initial SA from the upstream neighbor for one clock tick at the start of the transaction, then with the current local SA for the rest of the transaction. ISASELP1 controls the mux that selects what gets compared with the latched local SA, (i.e., "up/own addr"). ISASELP1 is the same as ISASEL delayed by one clock tick. |
| | CPU R/W | | Same as ISASEL delayed by one clock tick. |
| | DMA R/W | | Not used. |
| OBPSEL | | bp/own data | Controls the flow of data through one stage of the data pipeline (i.e., "bp/own data") by selecting data from either UDBP backplane data from the upstream or downstream neighbor) or own data (local data received from ISD). During the comparison phase of a transaction, data is always received from UDBP. |
| | CPU R | | Initially the address is driven onto the backplane by all the Bridges for comparison, and is received by each Bridge from its upstream neighbor via UDBP. Next, after determining which module has the target I/O device, upstream/downstream or own, data is received from that module until an acknowledge is received from that I/O device. After the read data has been received by all the Bridges, the data is transferred to the CPU and also driven onto the backplane for comparison. The data on the backplane is received by each module from its upstream neighbor (i.e., UDBP) for comparison. |
| | CPU W | | Information is continuously received from the upstream neighbor on UDBP for comparison purposes. |
| | DMA R | | Initially, the virtual address is broadcast across the backplane by the Bridge local to the I/O device that is doing the DMA. If the I/O device is local to the Bridge the own data path is selected (i.e., ISD); otherwise, the upstream/downstream data path is selected (i.e., UDBP). Next, the read data is output by the CPU on each module and driven onto the backplane for comparison. Data is received on each module from its |

-continued 6.1.5 Control and Status Within a Bridge Logic Unit

| Signal | Transaction | Destination | Description |
|---|---|---|---|
| | DMA W | | upstream neighbor (i.e., UDBP for comparison. Initially, the virtual address is broadcast across the backplane by the Bridge local to the I/O device that is doing the DMA. If the I/O device is local to the Bridge the own data path is selected (i.e., ISD); otherwise, the upstream/downstream data path is selected (i.e., UDBP). Next, the write data is output by the I/O device and broadcast across the backplane. Likewise, this data is received from ISD if the I/O device is local, or UDBP if it is not local. Once all the data has been transferred across the backplane to the Bridges, the virtual address followed by the address is transferred to the CPU and driven onto the backplane for comparison. Each item is received from the upstream neighbor (i.e., UDBP) for comparison. |
| SWDCLS | | Data switch | Controls the switch that separates ISD from PSD. Except for this switch, the Bridge logic actually sits on ISD and only connects to PSD when this switch is closed. The switch only needs to be open at the start of a DMA cycle when an I/O device is given control of ISD and the CPU still has control of PSD. |
| | CPU R/W | | If there is no DMA in progress, then the data switch is closed |
| | DMA R/W | | The switch is open from when the Bridge issues ISBG to a requesting I/O device until the Bridge receives PSBG from the CPU. |
| SWACLS | | Acknowledge switch | Controls the switch that separates ISACK from PSACK. |
| | CPU R/W, DMA W | | The switch is open. |
| | DMA R | | The switch is closed after the Bridge receives PSBG from the CPU. It is opened after the CPU has transferred all the requested data. |
| DVALD | | data compare | Indicates when data at "data compare" is valid. DVALID goes active when data has passed through the Bridge pipeline and reached "data compare." |
| | CPUR | | The data that goes from the Bridge to the processor, PSD, is compared. DVALD is generated based on PSACK. |
| | CPU W | | The data that goes from the Bridge to the I/O device, ISD, is compared. DVALD is generated based on ISACK. |
| | DMA R | | The virtual address sent to the CPU, PSD, is compared, and the data that goes from the Bridge to the I/O device, ISD, is compared. For the virtual address comparison, DVALD is generated based on PSBG, and for the data comparison DVALD is generated based on ISACK. |
| | DMA W | | The virtual address sent to the CPU, PSD, is compared, and the data that goes from the Bridge to the CPU, PSD, is compared. For the virtual address comparison, DVALD is generated based on PSBG, and for the data comparison DVALD id generated based on PSACK. |
| AVALD | | addr compare | Indicates when address information at "addr compare" is valid. AVALD goes active when an address has passed through the Bridge pipeline and reached "addr compare." Physical addresses are only compared during CPU initiated transactions. |
| | CPU R/W | | Goes active from the start of the transaction until the end. Generated based on PSAS. |
| | DMA R/W | | Not used. |

In operation a miscompare is detected, the state of the transaction information (data, address and control) from the "own" and upstream modules are latched inside the bridge logic unit of each module. System software can then perform diagnostics on this information (and can run additional tests to get more information) to determine which module is at fault. After the software determines which module is probably at fault, it may take that module off-line so that the user can replace it with a new module. Registers inside the bridge logic units are set by the software to take a faulty board off-line.

6.2 Bridge Data Exchange

A method and mechanism is provided to exchange data between modules using the bridge logic units. One use of this mechanism is to give all three processors synchronized access to corresponding I/O data that can differ in value. The implementation of this capability uses the respective backplane Input/Output (BPIO) registers in the bridge logic units of each module. To exchange data, the system software uses the following sequence.

1. Disable interrupts while the BPIO registers are in a potentially non-identical state.
2. Each processor reads a corresponding I/O register or DRAM location on its own module.
3. Each processor writes the data to its local BPIO register.
4. Reenable interrupts.
5. Each processor reads module A's BPIO register; the module A bridge logic unit facilitates this by sending its BPIO register contents over the backplane.
6. Each processor likewise reads module B's BPIO register.
7. Each processor likewise reads module C's BPIO register.
8. Each processor now has identical copies of the three values from the three corresponding BPIO registers. If a particular I/O device is faulty, only its local processor is exposed to the fault during the read in step 2 above.

6.3 Processor Read from BPIO

The following example involves a read from BPIO on a different module with comparisons enabled. Refer to the illustrative BPIO timing diagram of FIG. 8.

1. The processor drives out PSAS*, PSSLV*[0], SA[27:0] and the SBus master control signal (PSRD and PSSIZ [2:0]).

2. If the I/O bus is not busy (i.e., there is no DMA going on), then the bridge logic will drive PSAS*, PSSLV*[0], SA[27:0], PSRD, and PSSIZ[2:0] out onto the backplane for comparison. (To minimize the number of signals on the backplane, address and data are multiplexed. Address is only driven out once at the start of a processor initiated transaction. It is not driven out during a DMA transaction. Bridge control signal ISASEL enables the address onto the backplane, and ISDSEL enables the data onto the backplane.) The target of the transaction is inside of the bridge logic unit; therefore, there is no need to drive out any SBus salve select line. If the I/O bus is busy, the bridge will issue a retry acknowledge to the processor, and the processor will try the transaction again.

3. The timing for accesses to registers inside the bridge logic unit is predetermined, it is hardwired into the bridge and is the same for each module; therefore, the target of the transaction (i.e., the bridge logic) does not have to issue ISACK*[2:0] for the bridge logic to know when the data is available. In the current implementation, the data is available immediately, and it is broadcast across the backplane to the bridge logic units on the other modules.

4. The bridge logic unit on each module then issues an acknowledge to its processor, then passes out the data from the targeted module to its processor.

5. The bridge logic unit of each module then sends the data that went to its processor across the backplane to its downstream neighbor for comparison. This data passes though the data comparison pipeline as indicated by the bridge control signal DVALID. Likewise, valid address information for comparison is indicated by AVALID. Since the comparators are not directly in the path of the signal they are comparing, it does not matter how long it takes before the comparisons actually take place; the comparisons do not introduce delay on the I/O bus (as normal three-way voting logic could.)

6.4 Processor Write to BPIO

The following example involves a write to the own module with data comparisons disabled. Refer to the illustrative BPIO timing diagram of FIG. 8.

1. The processor drives out PSAS*, PSSLV*[0], SA [27:0], PSD [31:0] and the SBus master control signals (PSRD and PSSIZ [2:0]).

2. If the I/O bus is not busy (i.e., there is no DMA going on), then the bridge logic unit will drive PSAS*, PSSLV*[0], SA [27:0], PSRD, and PSSIZ [2:0] out onto the backplane for comparison. The target of the transaction is inside of the bridge logic unit; therefore, there is no need to drive out any SBus slave select line. If the I/O bus is busy, the bridge logic unit will issue a retry acknowledge to the processor, and the processor will try the transaction again.

3. The timing for the accesses to registers inside the bridge logic unit is predetermined, it is hardwired into the bridge and is the same for each module; therefore, the target of the transaction (i.e., the bridge logic) does not have to issue ISACK* [2:0] for the bridge logic unit to know when the data has been written. In the current implementation, it takes two ticks of SCLK to write the date, the bridge logic unit on each module then issues an acknowledge to its Processor.

4. The bridge logic unit of each module constantly drives out the data from its processor across the backplane to its downstream neighbor for comparison. This data passes through the data comparison pipeline of the bridge logic unit and is compared. (In the timing diagram of the FIG. 8, data comparisons are actually disabled.)

PSSLV*[n] SBus slave select from the processor to the bridge logic. The corresponding signals ISSLV*[n] go from the bridge logic unit to the I/O devices. PSSLV*[0] is for the registers (e.g., BPIO) inside the bridge logic unit (there is no ISSLV*[0] since it is internal to the bridge logic unit). Each target has a unique select line. These select lines are basically an extension of the address bits.

SWDCLS* Internal bridge logic unit control signal that controls when the switch between ISD [31:0] and PSD [31:0] is open. The switch is open from the start of a DMA transaction (i.e., when an ISBG*[n] is driven active by the bridge logic) until PSBG* is driven active by the processor.

Figure 8:
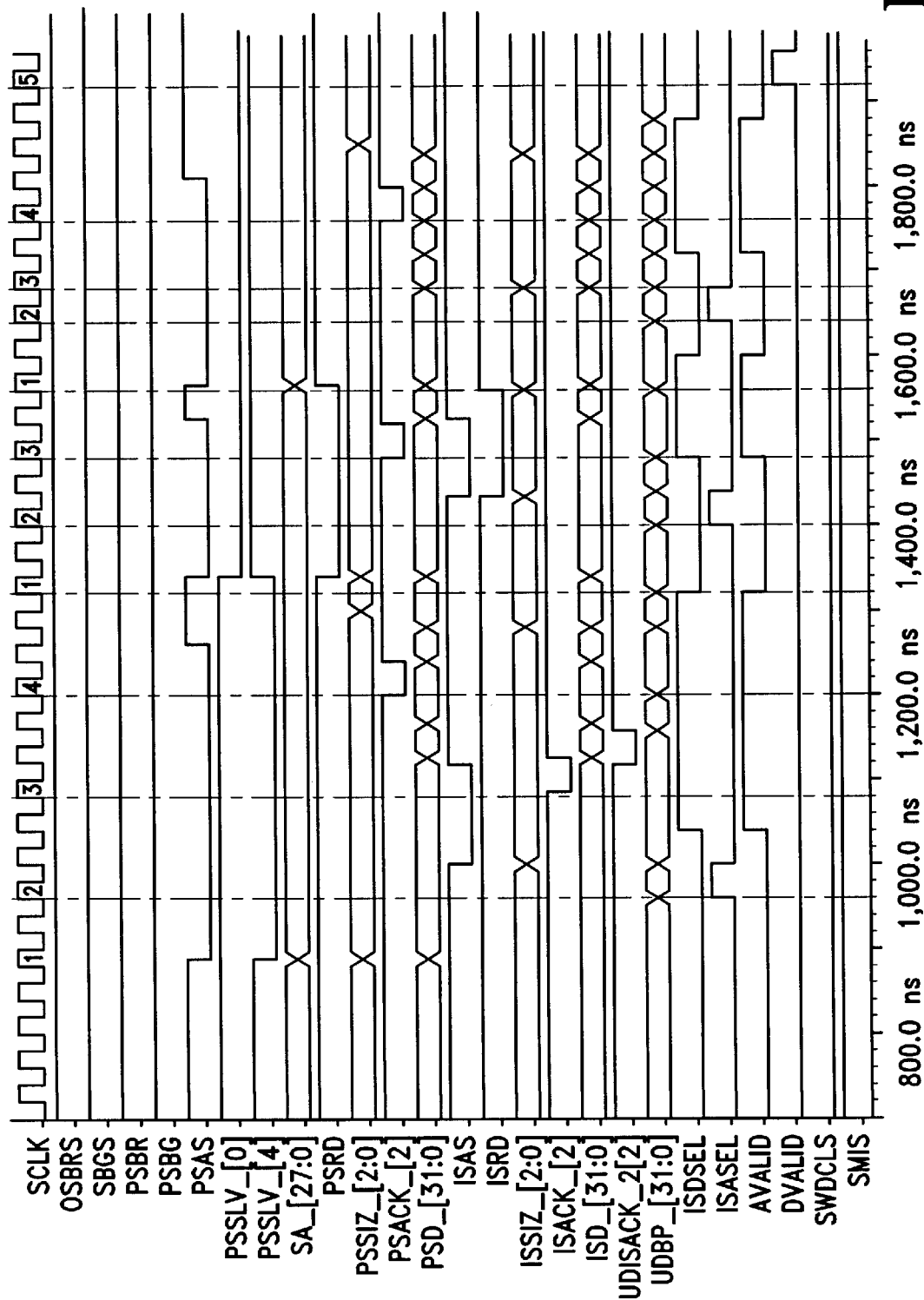
FIG. 8 is an illustrative timing diagram pertaining to a processor BPIO Read operation, and to a processor BPIO write operation in a TMR system employing bridge logic units like that in FIG. 7.

1. The timing diagram of FIG. 8 shows a simultaneous processor read from a local register on each module. The results of this read can be different for each module; therefore, it is done with comparisons disabled (i.e., DVALID never goes active).

2. Next, the data that was just read is written to BPIO, again with comparisons disabled.

3. Finally, the data from a particular module's BPIO is read out with comparisons enabled. In this way, data local to an individual module is broadcast to all three modules without the risk of an error on that module causing the other modules to fail. This same technique is also how data inside the processor (including the memory attached to the processor) is passed between modules.

6.5 Bridge I/O Transactions

All memory (DRAM) transactions are local to each module, and are unmodified from a conventional similar computer system. Transactions on the I/O bus (SBus in the present implementation), which have inter-module implications. are described here.

I/O bus transactions can be originated by the processor or by an I/O device (DMA); they can be reads or writes; and processor-originated transactions can be directed to corresponding local-module I/O devices, or to a single I/O device on a specified module. Each of these transactions is described below.

The following is a description of the data flow and control used in a presently preferred embodiment of the bridge logic based on SBus protocol for the I/O bus protocol.

6.6 Processor reads or writes local I/O device

In this transaction, the processor on each module reads or writes a corresponding I/O device registered on its local module—all in parallel, all in sync. The bridge logic unit performs a comparison only, with no inter-module I/O data transfers required.

---

6.7 Processor reads module-specific I/O device

CPU Read  PSD [31:0]: Data is received by each Bridge from the target I/O device via ISD on the local module and UDBP on the other modules. It is then driven out by each Bridge and received by each CPU via PSD. (In a presently preferred embodiment PSD and ISD are actually shorted together by a switch controlled by SWDCLS, so the data is on -continued 6.7 Processor reads module-specific I/O device both PSD and ISD.) Data is compared one clock tick
after PSACK (i.e., when the data is valid according to
SBus protocol).
SA[31:0]: The address is driven by each CPU and received
by its Bridge and I/O devices. One clock after PSAS goes
active, SA is driven out onto the backplane and is
received by each module's downstream neighbor as
UDBP (this is controlled by ISASEL) for comparison.
The local SA that was compared to the upstream
neighbor's SA is also latched inside the Bridge.
Throughout the rest of the transaction (i.e., while PSAS
remains active), the latched SA is compared to the
current SA.
PSSLV[4:0 : The slave select lines from the CPU are
compared in a similar fashion to SA. Basically, they are
like additional address bits.
PSAS: Driven by each CPU and received by its Bridge.
Always compared.
PSBG: Driven by each CPU and received by its Bridge in
response to a bus request, PSBR, from the Bridge.
Always compared, but should never go active during a
CPU initiated transaction.
PSRD: Driven by each CPU and received by its Bridge.
Compared during the entire transaction (while PSAS is
active).
PSSIZ[2:0]: Similar to PSRD.
PSACK[2:0]: Driven by each Bridge and received by its
CPU. Always compared.

Figure 9:
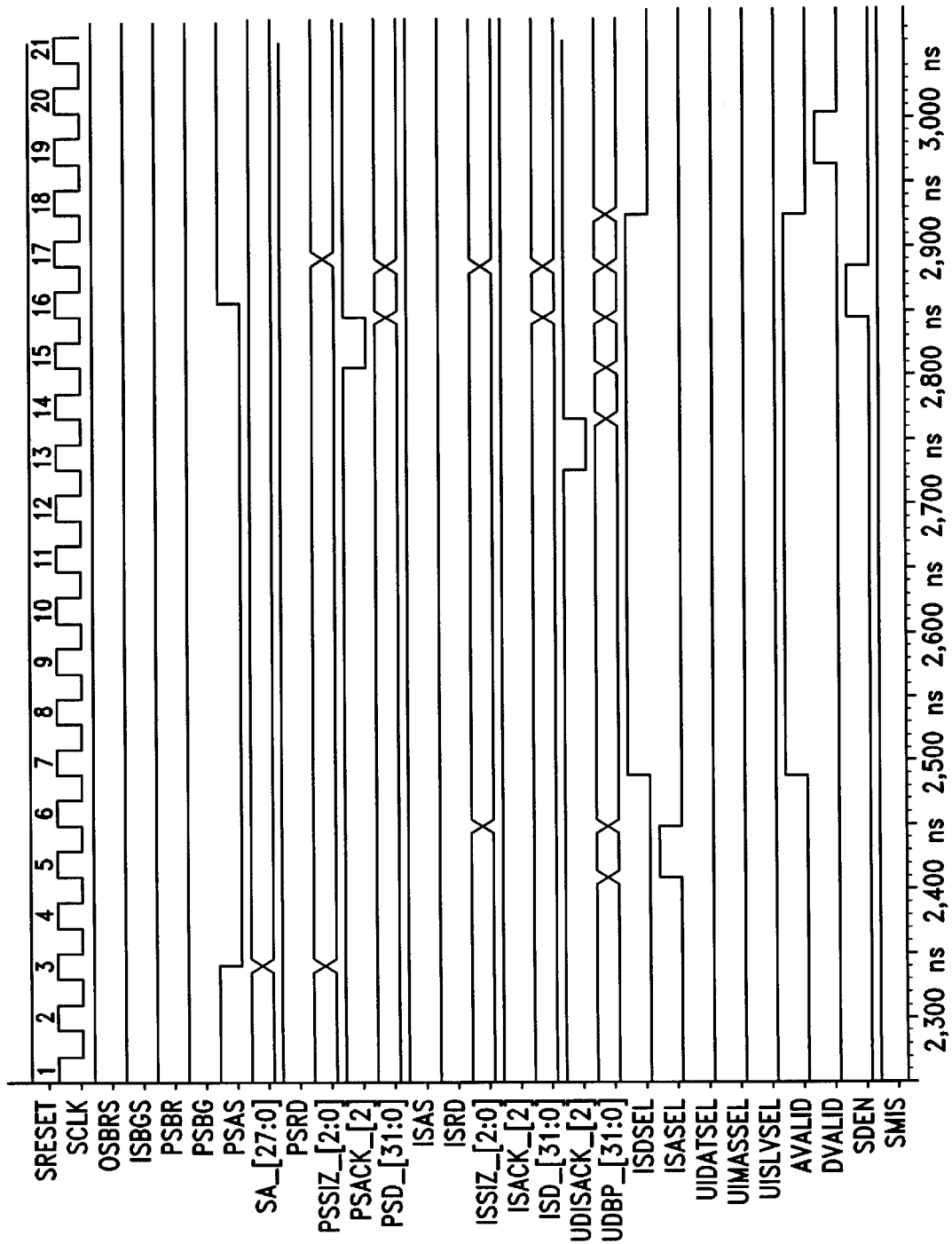
FIG. 9 is an illustrative timing diagram pertaining to a processor Read operation in a TMR system employing bridge logic units like that in FIG. 7.

Refer to the Processor Read timing diagram of FIG. 9. During Reads in the course of normal synchronous operation, the respective processors on each of the modules request a Read from the same I/O device local to one of the three modules. Hence, a typical processor Read transaction involves synchronous read requests of an identical device or location from three processors.

However, it should be noted that in certain circumstances, all three processors may simultaneously access corresponding I/O devices local to their own modules. For example, a processor local to module A may access an I/O device local to module A; a processor local to module B may access an I/O device local to module B; and a processor local to module C may access an I/O device local to module C. These local access, for instance, can be used to pass data between modules via BPIO registers and the backplane connections. Specifically, for example, each processor can read its local I/O device and temporarily store the result in its local BPIO register. The processors can then read each others' BPIO registers in order to share the data.

During Reads in the course of normal synchronous operation, the respective bridge logic on each module decodes the address signal issued by the processor on that module in conjunction with the read request. The bridge logic on the target module performs the actual read of the addressed I/O device, and sends the result (acknowledgment and data) of the read over the backplane to the respective bridge logic on the other respective modules. The respective bridge logic on each of the respective modules passes the (identical) data and acknowledgment signal to their respective processors. In the course of the processor read transaction, the respective bridge logic of neighboring modules compare control and data signals produced and/or transferred between neighboring processors and the target I/O device.

Referring to the illustrative drawing of FIG. 9, there is shown a timing diagram for an example of a processor read from the perspective of a processor on a different module than the target I/O device. At approximately clock tick T3, the processor drives out SBus address signals, SA[27:0] and slave select signals PSSLV[4:]. Also at T3, the processor drives out processor SBus read/write, PSRD, and processor address strobe, PSAS, and processor SBus size signals, PSSIZ[2:0]. It will be appreciated that, since in normal operation the three processors operate in synchronism, all three processors drive out these signals on their respective modules.

The higher order address bits are decoded by the bridge logic units in order to ascertain which module is local to the target I/O device or location. The processors also send slave select signals directed to a particular I/O devices.

If the I/O bus is not busy (i.e., there is no DMA going on), then at approximately T5 the bridge logic will drive SA[27:0], PSRD, and PSSIZ[2:0] out onto the backplane for comparison. That is, the bridge logic on each module will drive these signals to a neighboring downstream module for comparison. In order to minimize the number of signals on the backplane, address signals and data signals are multiplexed. Specifically, address signals are only driven out once at the start of a processor initiated read transaction. After that, data signals are presented on the same lines. However, if more dedicated signal lines were provided, such multiplexing might not be necessary.

More particularly, at approximately T5, bridge logic internal control signal, I/O SBus address select, ISASEL, enables the address onto the backplane, and shortly thereafter bridge logic internal control signal, I/O SBus data select, ISDSEL, enables the data onto the backplane. The bridge logic on the module that has the target I/O device also drives out a slave select control signal for the target device identified in SA[27:0] and PSSLV[4:0]. In the current embodiment, control signals are continuously driven onto the backplane to the downstream neighbor. However, the signals are compared only when they are supposed to be valid in accordance with the SBus protocol.

The up/down backplane, UDBP[31:0], signal represents the above described passage of address information from the upstream module via the backplane at about clock tick T5. The UDBP[31:0] signal also represents the above described passage of data from the upstream or downstream module (whichever is local to the I/O device from which the data is read), via the backplane, at about clock tick T14. Note that the UDBP[31:0] signal also represents the passage of data from the upstream module for comparison at about clock tick T17.

If the I/O bus is busy, the respective bridge logic units will issue a retry acknowledge on the PSACK[2:0] lines to their respective processors, and the processors, operating in synchronism, will try the transaction again. Eventually, at about clock tick T12, the target I/O device will issue an I/O device acknowledge signal, ISACK, followed by the actual read data. Note that the time at which ISACK is driven is not predetermined but rather depends upon the I/O device. Also, note that ISACK does not change in the illustrated timing diagram because ISACK is driven on another module local to the target I/O device. The exemplary timing diagrams are for a module that is not local to the target I/O device. In response, at approximately T13 the bridge logic unit of the module local to target I/O device broadcasts its I/O SBus acknowledge signal to the other modules which receive it from across the backplane as their upstream/downstream I/O device acknowledge signal, UDISACK, followed by the data across the backplane to the bridge logic on the other modules.

At approximately T14, UDBP[31:0] has the data output from the target I/O device. The data valid signal, DVALID, indicates when the data coming from the UDBP[31:0] and the I/O SBus data, ISD, have made it through the comparison logic's comparison stage of the pipeline. It will be appreciated that the ISD data is the local data, and the UDBP data is the data local to the upstream module. These data should be identical if there are no faults. If there are differences between these data then there may be a fault in the system. The comparison logic will detect the possible fault. At approximately T15, the bridge logic on each module passes a processor SBus acknowledge signal, PSACK, followed at T16 by the delivery of the data, PSD, (read from the target device) to its respective processor.

During approximately, T7–T18, the AVALID signal is issued synchronously by the bridge logic unit on each module. At approximately T19, a DVALID signal is issued synchronously by the bridge logic unit on each module based on the ISACK signal of the target I/O device. The AVALID and the DVALID signals respectively indicate that address and data signals have been transferred over the backplane and are ready for comparison by the comparison logic.

The I/O device SBus address strobe is driven by the bridge logic unit local to the target device to address the target I/O device. The ISRD signal is driven by each of the bridge logic units to enable the transfer of data to be read. The UIDATSEL signal indicates which module is the source of data during a Read transaction.

At approximately T17, the bridge logic of each module issues an ISDSEL signal which causes the downstream transfer of the data that was sent to its respective processor. This downstream transfer takes place across the backplane. The transferred data is sent to its downstream neighbor for comparison. This data passes through the data comparison pipeline of the bridge logic and is eventually compared. Valid/invalid data in the data comparison pipeline is indicated by the logical state of bridge control signal DVALID which is used by the bridge logic unit. Likewise, valid/invalid address information in the comparison pipeline is indicated by the logical state of AVALID which is used by the bridge logic. Since the comparators are not directly in the path of the signals they are comparing, the time required to perform the comparisons is not critical. Thus, the comparisons do not introduce delay on the I/O bus as in certain conventional three-way voting logic.

6.7.1 Comparisons During Processor Read of a Module-specific I/O Device

During a Read, each given module compares the following control, address and data signals transacted directly with such module to the corresponding control, address and data signals transacted directly with such module's upstream neighbor. The upstream neighbor data and address signals are transferred downstream (from such upstream module to such given module) as part of the UDBP signals described above. Upstream neighbor control signals are transferred downstream on dedicated lines.

The compared signals are: PSBG, PSAS, SA, PSSLV, PSRD, PSSIZ, PSACK and PSD.

| 6.8 Processor writes module-specific I/O device | |
|---|---|
| CPU Write | ISD: Data is driven by each CPU and received by its Bridge via PSD. It is passed on through the Bridge to the I/O device via ISD. (In a presently preferred embodiment this is done by closing a switch, controlled by SWDCLS, that shorts together PSD and ISD.) |

| -continued |
|---|
| 6.8 Processor writes module-specific I/O device |
| The data is compared when ISACK is issued by the I/O device (i.e., when the data is latched into the I/O device according to SBus protocol). |
| SA: Same as CPU read. |
| PSSLV: Same as CPU read. |
| PSAS: Same as CPU read. |
| PSBG: Same as CPU read. |
| PSRD: Same as CPU read. |
| PSSIZ: Same as CPU read. |
| PSACK: Same as CPU read. |

Figure 10:
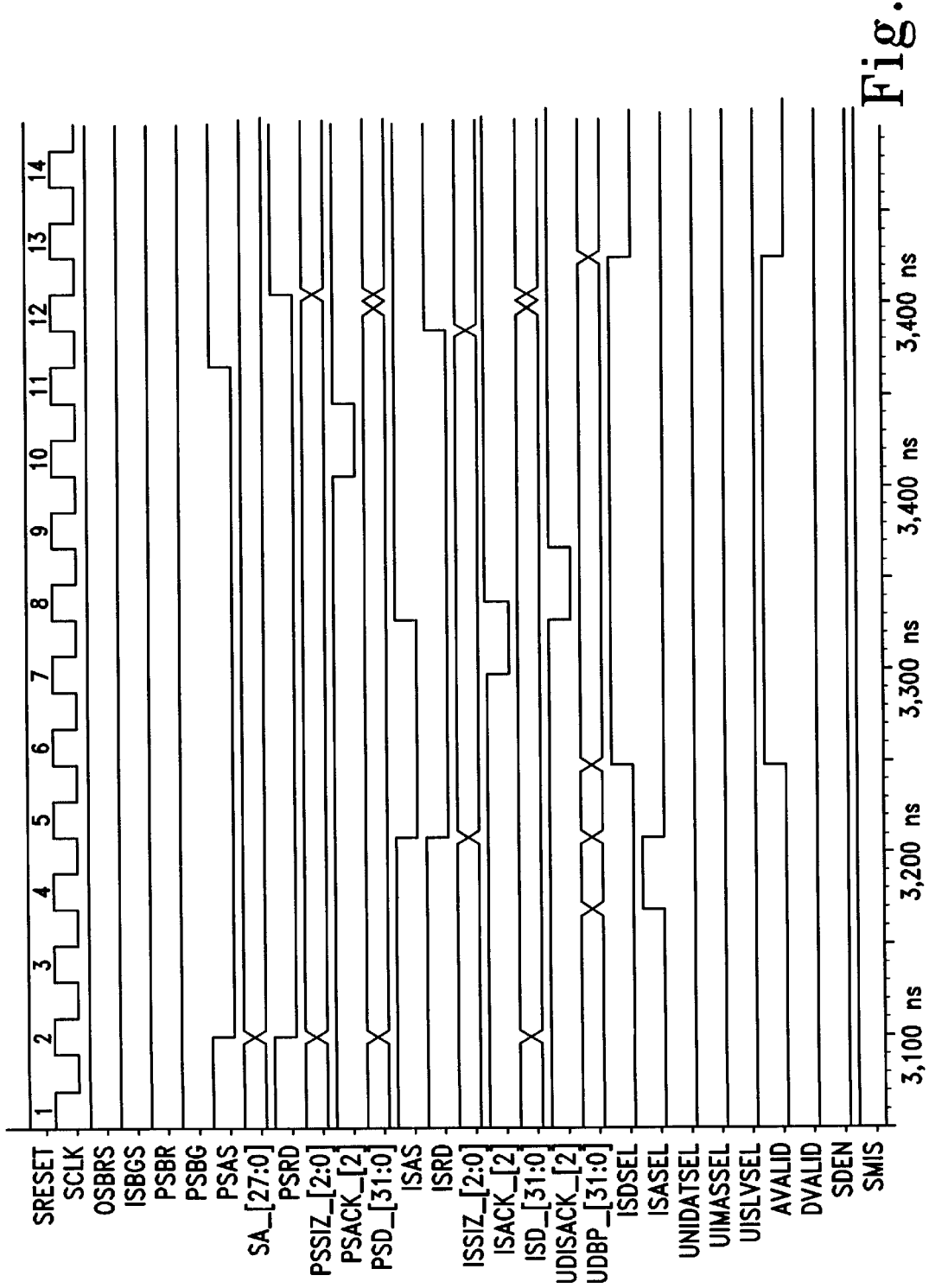
FIG. 10 is an illustrative timing diagram pertaining to a processor Write operation in a TMR system employing bridge logic units like that in FIG. 7.

Refer to the Processor Write timing diagram of FIG. 10. In the current embodiment, the respective processors on each of the modules may synchronously request a write to a target I/O device local to only one of the multiple modules. Although all three processors transact all of the signals involved in the write operation, only the processor on the module local to the target I/O device actually performs the write. Thus, while each bridge logic unit decodes the I/O device address received from its local processor, only the bridge logic unit local to the target I/O device transmits the slave select and I/O device Sbus address strobe, ISAS, to the target I/O device. The bridge logic unit on the target module performs the actual write to the addressed I/O device and sends the result of the write (acknowledgment) over the backplane to the bridge logic units on the other modules. In the course of the processor write transaction, the respective bridge logic units of neighboring modules compare control, data and address signals produced and/or transferred between processors and the target I/O device.

Referring to the illustrative drawing of FIG. 10, there is shown a timing diagram for an example of a write to a target I/O device from the perspective of a respective bridge logic unit disposed on the same module as the target I/O device. Note that, in the illustrated example, data comparisons are disabled because of the addressing mode of the Write transaction. At approximately clock tick T2, the processor drives out, SBus address, SA[27:0], processor data, PSD[31:0], and processor SBus address strobe, PSAS. The processor also drives out processor SBus master control signals, PSRD and PSSIZ[2:0]. It will be appreciated that each of the processors drives out these same signals provided that the three processors are in synchronism in a normal operational mode.

If the I/O bus is not busy (i.e., there is no DMA going on), then at approximately clock tick T4, the bridge logic unit issues ISASEL which causes SA[27:0], PSRD, and PSSIZ[2:0] to be driven out onto the backplane for delivery to the downstream module for comparison. The bridge logic unit local to the module that is local to the target I/O device also drives out a slave select signal (not shown) at approximately T2 or T4 depending on the target I/O device. The bridge logic unit drives ISASEL active for one clock cycle to enable the address onto the backplane for comparison. It then drives ISDEL active to enable data onto the backplane for comparison. ISDEL is driven until an acknowledge is received from the target I/O device If the I/O bus is busy, the bridge logic will issue a retry acknowledge on PSACK[2:0] (not shown) to the processor, and the processor will try the transaction again.

Eventually, at approximately T7 in the illustrative example, the target I/O device issues an acknowledge signal. At approximately T8, one clock tick after the target I/O device issues its acknowledge, ISACK, the bridge logic unit local to the target I/O device broadcasts this acknowledge across the backplane to the bridge logic on the other modules. The upstream/downstream slave control signal select, UISLVSEL, on the module(s) receiving the acknowledge selects whether to use the acknowledge from the upstream or the downstream module. The bridge logic unit on each module then passes the acknowledge to its respective processor. Thus, in essence, the target I/O device issues an ISACK when it has written the data. This acknowledge signal is broadcast over the backplane, received by each bridge logic unit, and is transferred-to the processors.

During the transfer of write data during clock ticks T6–T12, indicated by ISDSEL, the bridge logic unit of each module drives out the data from its processor across the backplane to its downstream neighbor for comparison. This data passes through the data comparison pipeline of the bridge logic and is eventually compared at approximately clock tick T10, about three ticks after ISACK. Note that in the present embodiment data is not actually compared until an acknowledge is received from the target I/O device because it is only at the receipt of the acknowledge that the target I/O device latches in the data.

Note that in the illustrative timing diagram of FIG. 10, data comparisons are actually disabled. In certain cases, computer software simultaneously reads data from different modules when the data read from the different modules is known to be different. In these special cases, the comparisons typically are disabled.

The AVALID signal is an internal bridge logic unit control signal which indicates when the address signals are valid and ready for comparison. The DVALID signal is an internal bridge logic unit control signal which indicates when the data are valid and ready for comparison. The UDISACK signal is the ISACK signal transmitted across the backplane by the (upstream or downstream) module local to the target I/O module. ISRD is the I/O device SBus read signal generated by the bridge logic unit based upon PSRD. ISAS is the I/O SBus address strobe signal driven only by the bridge logic unit local to the target I/O device.

6.8.1 Comparisons during Processor write to a module-specific I/O device

During a Write, each given module compares the following control, address and data signals transacted directly with such module to the corresponding control, address and data signals transacted directly with such module's upstream neighbor. The upstream neighbor signals are transferred downstream (from such upstream module to such given module) as part of the UDBP signals described above.

The compared signals are: PSBG, PSAS, SA, PSSLV, PSRD, PSSIZ, PSACK and PSD.

| 6.9 I/O device reads memory via DMA |
|---|
| DMA Read   ISD: Data is driven by each CPU and received by its Bridge via PSD. It is passed on through the Bridge to the I/O device via ISD. (In a presently preferred embodiment this is done by closing a switch, controlled by SWDCLS, that shorts together PSD and ISD.) PSACK from the CPU is also transferred through the Bridge to ISACK of the I/O devices. (In a presently preferred embodiment this is done by closing a switch, controlled by SWACLS, that shorts together PSACK and ISACK. It is only closed for a DMA read.) The data is compared one clock after PSACK is issued by the CPU (i.e., when the data is latched into the I/O device according to SBus protocol).<br>PSAS: Same as CPU read.<br>PSRD: The SBus read/write signal is driven by the I/O |

| -continued |
|---|
| 6.9 I/O device reads memory via DMA |
| device and received by each Bridge via ISRD on the local module and UDISRD on the other modules. After each Bridge receives PSBG from its CPU, it drives out the read/write signal to its CPU via PSRD. Compared when PSBG is active and when PSAS is active if it happens to go active during a DMA read.<br>PSSIZ: Similar to PSRD.<br>PSACK: Driven by each CPU and received by its Bridge. Passed to the I/O device by its Bridge via ISACK. Always compared.<br>Note that SA and PSSLV are not compared during DMA because a presently preferred embodiment only supports DMA between an I/O device and CPU memory, not between two I/O devices; therefore, the address information does not have to be valid. |

Figure 11:
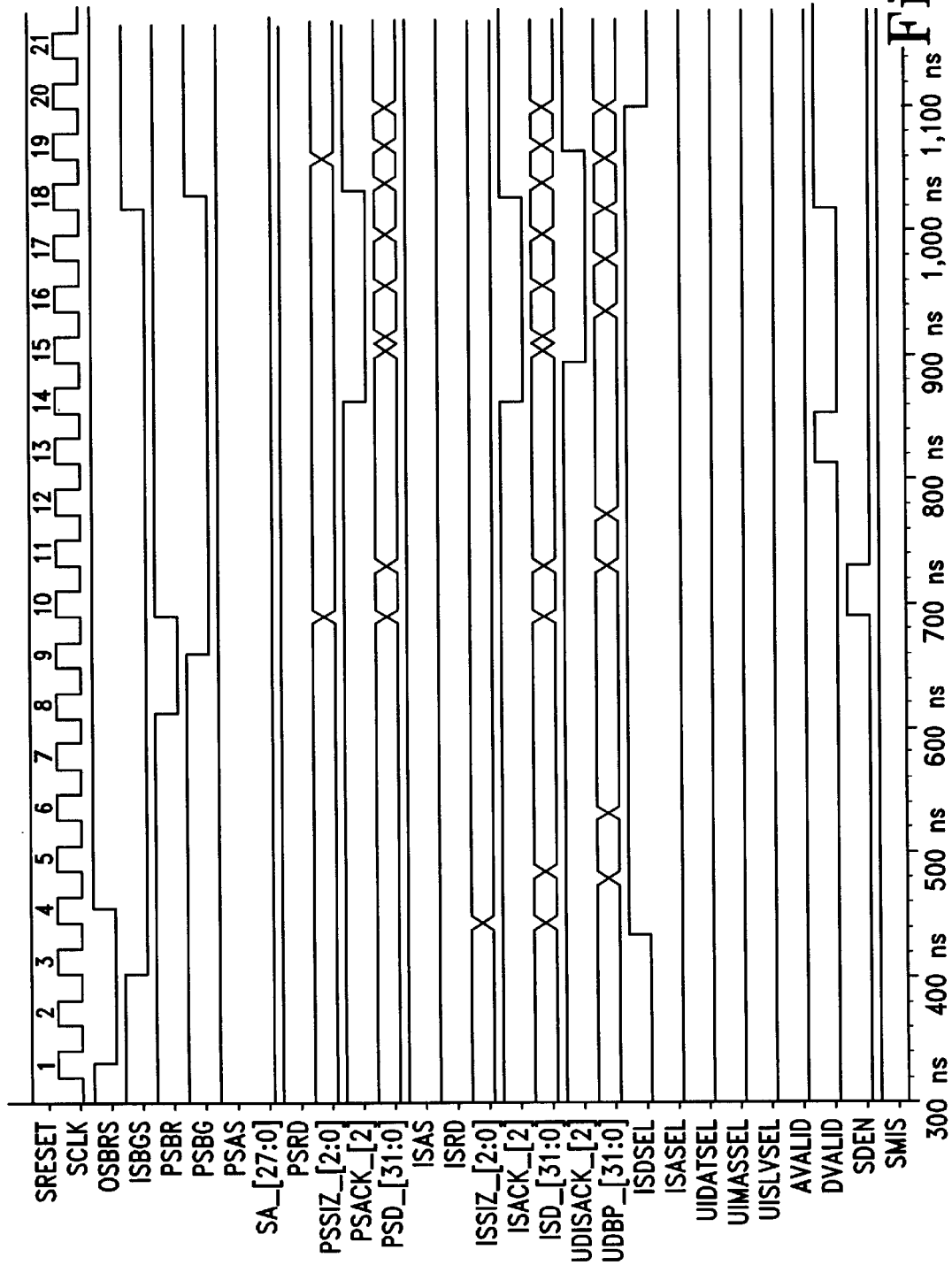
FIG. 11 is an illustrative timing diagram pertaining to a DMA Read operation in a TMR system employing bridge logic units like that in FIG. 7.

Refer to the DMA Read timing diagram of FIG. 11. In the present embodiment of the invention, an I/O device (e.g. MACIO) may employ DMA (direct memory access) techniques to read information from processor memory. In the example described below, the I/O device requests from the bridge logic units on all modules access to processor memory. It will be appreciated, however, that the same basic principles may apply when access to another I/O device is requested.

In the current embodiment, a requesting I/O device may issue a Bus Request signal to all of the bridge logic units. The local bridge logic responds with Bus Grant, and accepts the DMA address from the I/O device. Note that although an I/O device local to one module issues the request, that request is passed to all of the bridge logic units and eventually to all of the processors acting in synchronism. More particularly, after issuing a bus grant, the local bridge logic unit passes the DMA address from the I/O device to the bridge logic units on the other modules, and the bridge logic units on each module synchronously pass the request to their processors. Synchronous operation is maintained because each bridge logic unit initially receives the bus request from the I/O device at the same time and all three units simultaneously determine when that I/O device bus request is granted. Each processor responds with a bus grant and accepts the DMA address from its respective bridge logic unit. Each processor then reads its own local memory and sends the resulting data to its own local bridge logic unit. In the course of the DMA read operation, the bridge logic units of neighboring modules compare control and data signals produced and/or transferred between processors and the requesting I/O device.

Note that it is only the bridge logic unit local to the requesting I/O device that actually passes the data to the requesting I/O device. The fact that only the module local to the requesting I/O device actually communicates with the requesting I/O device is significant because a "bad" processor or processor memory can only send "bad" data to its own local I/O devices and cannot corrupt I/O devices local to the other modules.

Referring to the illustrative timing diagram of FIG. 11, there is shown a timing diagram for an example of a four word DMA read from the perspective of a bridge logic unit in which the reading I/O device and the read from device (in this case processor memory) are local to the same module. At approximately clock tick T1, an I/O device drives out its SBus request, OSBRS, to the bridge logic unit of all of the modules. The OSBRS is sent to all modules via backplane interconnects. When the I/O bus becomes free (i.e., no processor initiated transaction in progress and no higher order I/O device requesting the bus), the arbitration logic of the local bridge logic unit (not shown) issues an I/O SBus grant, ISBGS to the requesting I/O device as shown at clock tick T3. Note that although each bridge logic unit generates internal signals granting the bus to the requesting I/O device, only the bridge logic unit local to the target I/O device actually drives the bus grant to the target I/O device. At approximately clock tick T4, the I/O device then drives out a virtual address onto the I/O bus data lines, ISD. Also, at about T4, the I/O device drives out the SBus master control signals, ISSIZ and ISRD.

At approximately T5, the bridge logic unit of the module local to the requesting I/O device issues ISDSEL which broadcasts the virtual address over the backplane on the UDBP of the receiving modules, and broadcasts the SBus master control signals to the other modules over the backplane. Each bridge logic unit checks that the virtual address is valid for the I/O device requesting the DMA read. That is, each module is allocated a section of memory. I/O devices local to a given module can only perform DMA Reads of the portion of memory allocated to their module.

If it is not valid, then the bridge logic units on all of the modules issue error acknowledges to the requesting I/O device. The I/O device actually receives the error acknowledge from its local bridge logic unit. The respective bridge logic units on the different modules issue interrupts to their respective processors, and the transaction is terminated. If the virtual address is valid, however, then at approximately T8, the bridge logic issues a processor SBus request signal, PSBR, to its local processor. Eventually, at about T9 in this example, the respective processors issue respective processor SBus grant signals, PSBG, to their local bridge logic units. Then at about T10, the bridge logic units drive out the virtual address on PSD (which also is connected to ISD via a switch) and drive out SBus master control signals PSSIZ and PSRD to their respective processors. The virtual address is driven on PSD, not SA; therefore, it is driven onto the backplane when ISDSEL is active. ISASEL is inactive throughout the DMA The virtual address that was sent to the processors goes out onto the backplane for comparison and is received from the upstream module on UDBP. Eventually, at about T14 in this example, the respective processors drive out acknowledge signals, PSACK, which are passed on to ISACK via a switch on the bridge logic unit. At approximately T15, the processor drives out PSD, which is passed on to ISD via a switch on the bridge logic unit. The bridge logic unit that is local to the requesting device actually passes the acknowledge followed by data to the requesting I/O device. Also, at about T15, while ISDSEL is active, each module drives out the data onto the backplane for delivery to its downstream neighbor for comparison. Note that the data/address are driven out onto the backplane via OBP. Data/address, however, are received over the backplane via UDBP which is a board input. Thus, the downstream neighbor receives the data on UDBP. The bridge logic units select the upstream or downstream information for the requested read data based upon UIDATSEL.

6.9.1 Comparisons During I/O Device Reads From Memory Via DMA

During an I/O device Read via DMA, each given module compares the following control, address and data signals transacted directly with such module to the corresponding control, address and data signals transacted directly with such module's upstream neighbor. The upstream neighbor signals are transferred downstream (from such upstream module to such given) module as part of the UDBP signals described above.

The compared signals are: PSBG, PSAS, PSRD, PSSIZ, PSACK and PSD.

| 6.10 I/O device writes memory via DMA | |
|---|---|
| DMA Write | PSD[31:0]: Data is received by each Bridge from the I/O device via ISD on the local module and UDBP on the other modules, and is stored in the DMA FIFO of each Bridge. After each Bridge receives PSBG from its CPU, the data is then driven out by each Bridge and received by each CPU via PSD. (In a presently preferred embodiment PSD and ISD are actually shorted together by a switch controlled by SWDCLS, so the data is on both PSD and ISD.) Data is compared one clock tick after PSACK (i.e., when the data is valid according to SBus protocol).<br>PSAS: Same as CPU read.<br>PSRD: Same as DMA read.<br>PSSIZ: Same as DMA read.<br>PSACK: Driven by each CPU and received by its Bridge. ISACK was issued to the I/O device by its Bridge when the Bridge was receiving the DMA data into its DMA FIFO; therefore, the acknowledge received by the Bridge from the CPU is not passed on to the I/O device. Always compared.<br>Note that SA and PSSLV are not compared during DMA because a presently preferred embodiment only supports DMA between an I/O device and CPU memory, not between two I/O devices; therefore, the address information does not have to be valid. |

Figure 12:
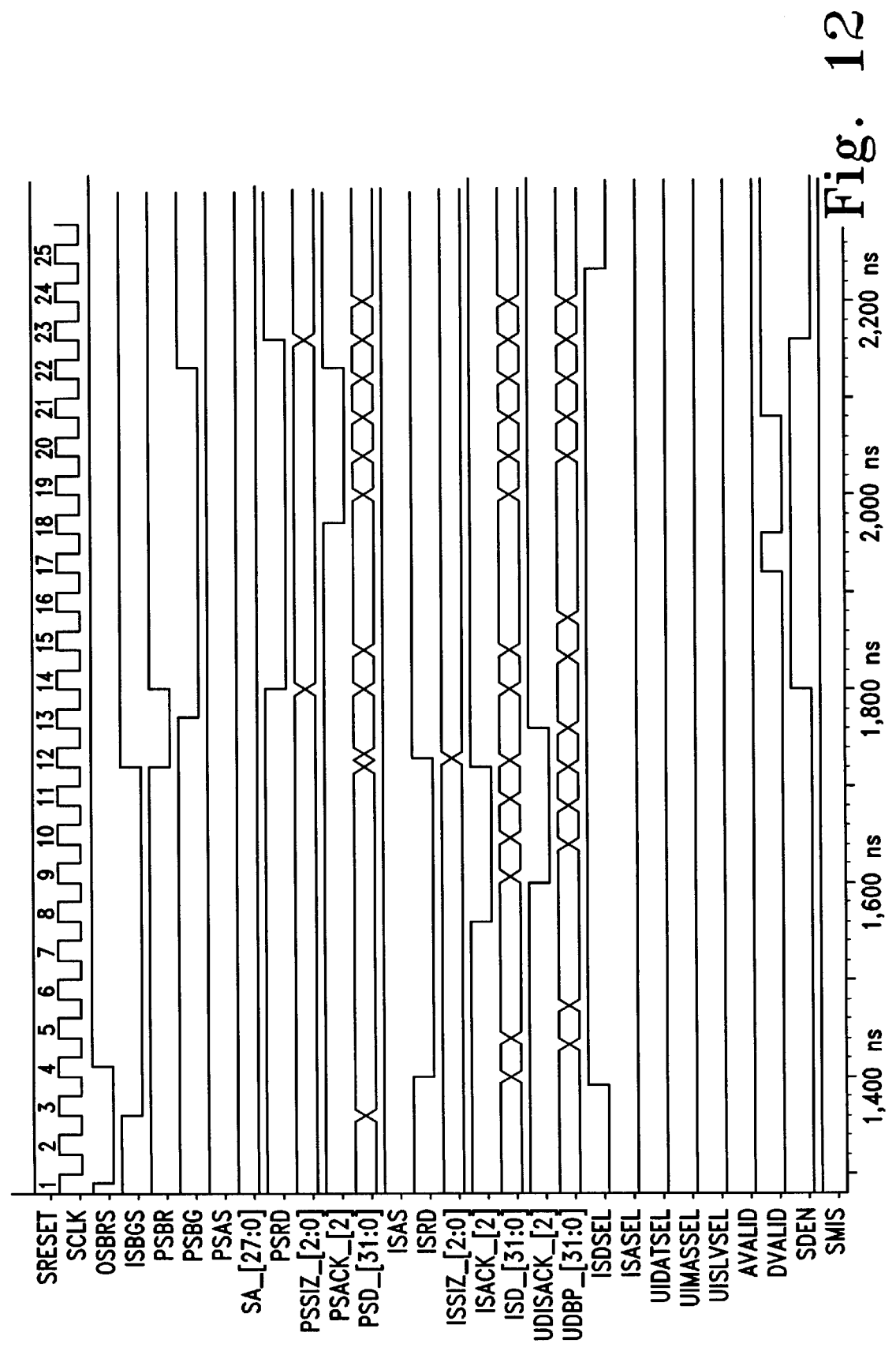

Refer to the DMA Write timing diagram of FIG. 12. In the present embodiment of the invention, an I/O device may employ DMA (direct memory access) techniques to write information to processor memory. In the example set forth below the I/O device requests access to processor memory. It will be appreciated, however, that the same basic principles apply when access to another I/O device is requested.

In the current embodiment, a requesting device may issue a bus request signal. The bridge logic responds by issuing a bus grant signal and accepts the DMA virtual address from the requesting I/O device. The local bridge logic, which is on the same module as the requesting I/O device, passes the virtual address over the backplane to the bridge logic on the other modules. The local bridge logic accepts the write data from the requesting I/O device and transfers it over the backplane to the bridge logic on the other modules. Each respective bridge logic stores the write data in its respective local FIFO buffer. The respective bridge logic pass the bus request to their local processors. Each respective processor responds with a bus grant, and accepts the DMA virtual address from its local bridge logic. Each processor then accepts the write data from its local bridge logic and writes it to its own main memory. In the course of the DMA write operation, the bridge logic of neighboring modules compare control signals and data signals produced and/or transferred between neighboring processors and the requesting I/O device. Note that although the DMA in the current embodiment is targeted to read or write to main memory, it is consistent with the invention to implement a system in which one I/O device targets a DMA read or write to another I/O device.

Referring to the illustrative timing diagram of FIG. 12, there is shown a timing diagram for an example of a four word DMA write from the perspective of the module local to the writing I/O device. At about clock tick T1, a writing I/O device drives out its SBus request strobe, OSBRS, to the bridge logic of all the modules. When the I/O bus becomes free (i.e., no processor initiated transaction in progress or bus request from a higher priority I/O device), at about T3 in the example, the arbitration logic of each bridge logic unit issues a I/O SBus grant strobe, ISBGS. However only the bridge logic unit local to the target I/O device actually drives out the ISBGS signal to the target I/O device. In response, at about T4, the requesting I/O device drives out a virtual address onto the SBus data lines, ISD. Also at T4, the I/O device drives out the I/O SBus master control signals: ISRD and ISSIZ. The virtual address and the SBus master control signals are broadcast over the backplane by the bridge logic unit local to the I/O device and are received by the other modules. The respective bridge logic units check that the virtual address is valid for the I/O device requesting the DMA.

If the virtual address is not valid, then each respective bridge logic issues an error acknowledge directed to the requesting I/O device. Although only the bridge logic unit local to the requesting I/O device actually provides the error acknowledge to the device. Each bridge logic unit issues an interrupt to its respective processor and the transaction is terminated.

If the virtual address is valid, then at about T8 the respective bridge logic unit local to the module with the requesting I/O device begins issuing I/O SBus acknowledges, ISACKs, to the requesting I/O device, thereby receiving the data into its DMA FIFO. At about T9, the bridge logic broadcasts the I/O device data to the upstream and downstream modules which in turn begin receiving the data via UDBP. The other bridge logic units store the data coming from the backplane into their respective DMA FIFOs.

At about T12, when all of the data is stored in the respective FIFOs, the bridge logic of each respective module issues a processor SBus request, PSBR, to its respective processor. Eventually, at about T13 in this example, the respective processors issue processor SBus grants, PSBG, to their respective bridge logic. In response, at T14 the respective bridge logic drives out the virtual address on PSD (which is connected to ISD via a switch), PSRD and PSSIZ. Eventually, at about T18 in this example the respective processors start issuing acknowledges, and the data, PSD, is transferred out of the respective DMA FIFOs and into respective processors' memories. Each respective bridge logic unit drives the data and control transferred into and out of its processor out across the backplane to its downstream neighbor for comparison.

6.10.1 Comparisons During I/O Device Writes to Memory Via DMA

During an I/O device Write via DMA, each given module compares the following control, address and data signals transacted directly with such module to the corresponding control, address and data signals transacted directly with such module's upstream neighbor. The upstream neighbor signals are transferred downstream (from such upstream module to such given module) as part of the UDBP signals-described above.

The compared signals are: PSBG, PSAS, PSRD, PSSIZ, PSACK and PSD.

Although the preferred embodiment of this invention is based on the architecture of the Sun Microsystems, Inc. SPARCstation 5 which uses the microSPARC-II for the processor, the SBus for the bus protocol, and Solaris 2 for the operating system, the scope of this patent is in no way intended to be limited to this specific configuration. Thus, the principles of the invention are applicable to any bus protocol and operating system, and to any processor that can be brought into a known state through some type of initialization mechanism such as a hardware and/or software reset.

Possible processors include but are not limited to the Pentium from Intel, Alpha from DEC, PowerPC from Motorola, etc. Possible bus protocols include but are not limited to PCI, UPA and ISA. Possible operating systems include but are not limited to Windows NT, and UNIX.

While a particular embodiment of the invention has been described in detail, various modifications to the preferred embodiment can be made without departing from the spirit and scope of the invention. Thus, the invention is limited only by the appended claims.

What is claimed is:

1. A redundant clock system comprising:
   a first oscillator which produces first reference clock signals;
   a second oscillator which produces second reference clock signals;
   a third oscillator which produces third reference clock signals;
   a first multiplexer which receives the first, second and third reference clock signals from the first, second and third oscillators and which provides a designated one of the received reference clock signals as a selected reference clock signal;
   a second multiplexer which receives the first, second and third reference clock signals from the first, second and third oscillators and which provides a designated one of the received reference clock signals as a selected reference clock signal;
   a third multiplexer which receives the first, second and third reference clock signals from the first, second and third oscillators and which provides a designated one of the received reference clock signals as a selected reference clock signal;
   a first phase-locked loop (PLL) circuit coupled in a first feedback circuit in which the first PLL receives as reference input the selected reference clock signal provided by first multiplexer and receives as feedback input a first output clock signal;
   a second phase-locked loop (PLL,) circuit coupled in a second feedback circuit in which the second PLL receives as reference input the selected reference clock signal provided by the second multiplexer and which receives as feedback input the a second output clock signal;
   a third phase-locked loop (PLL) circuit coupled in a third feedback circuit in which the third PLL receives as reference input the selected reference clock signal provided by the third multiplexer and receives as feedback input a third output clock signal; and
   a reference clock designation unit which determines whether any one of the first, second or third reference clock signals has failed and which designates one of the two other reference clock signals in the event that one of the reference clock signals has failed.

2. The redundant clock system of claim 1 wherein the reference clock designation unit determines whether any one of the first, second or third reference clock signals has failed by determining whether any one of the first, second or third reference clock signals is operative at or greater than a prescribed amount faster or is operative at or less than a prescribed amount slower than the other two reference clock signals.

3. The redundant clock system of claim 1 wherein the reference clock designation system includes:
   a first counter which counts clock ticks of the first reference clock signal;

a second counter which counts clock ticks of the second reference clock signal;

a third counter which counts clock ticks of the third reference clock signal; and a comparator which compares the clock tick counts of the first, second and third reference clock signals.

4. The redundant clock system of claim 1 wherein the reference clock designation system includes:

a first counter which counts clock ticks of the first reference clock signal;

a second counter which counts clock ticks of the second reference clock signal;

a third counter which counts clock ticks of the third reference clock signal; and a comparator which compares the clock tick counts of the first, second and third reference clock counts during prescribed timing intervals.

5. The redundant clock system of claim 1 wherein the normal operating frequencies of the first, second and third reference clock signals are the same as the operating frequencies of the first, second and third output clock signals.

6. The redundant clock system of claim 1 further including:

a first system module which includes a first processor;

a second system module which includes a second processor; and a third system module which includes a third processor;

wherein the first oscillator and the first multiplexer and the first PLL are disposed with the first system module;

wherein the second oscillator and the second multiplexer and the second PLL are disposed with the second system module;

wherein the third oscillator and the third multiplexer and the third PLL are disposed with the third system module; and the redundant clock system further including, transfer circuitry which transfers respective first, second and third reference clock signals among the first, second and third multiplexers.

7. The redundant clock system of claim 1 further including:

a first electronics system module;

a second electronics system module;

a third electronics system module;

wherein the first oscillator and the first multiplexer and the first PLL are disposed with the first system module and the first clock signal is provided to the first system module;

wherein the second oscillator and the second multiplexer and the second PLL are disposed with the second system module and the second clock signal is provided to the second system module;

wherein the third oscillator and the third multiplexer and the third PLL are disposed with the third system module and the third clock signal is provided to the third system module; and the redundant clock system further including, transfer circuitry which transfers respective first, second and third reference clock signals among the first, second and third multiplexers.

8. The redundant clock system of claim 1, wherein the first output clock signal is provided as a first bus clock operative with a first bus which serves a first processor;

wherein the second output clock signal is provided as a second bus clock operative with a second bus which serves a second processor;

wherein the third output clock signal is provided as a third bus clock operative with a third bus which serves a third processor.

9. The redundant clock system of claim 1 further including:

first frequency divider circuitry coupled in the first feedback loop so as to provide the feedback input to the first PLL;

second frequency divider circuitry coupled in the second feedback loop so as to provide the feedback input to the second PLL; and third frequency divider circuitry coupled in the third feedback loop so as to provide the feedback input to the third PLL .

10. A redundant clock system comprising:

a first electronics system module;

a second electronics system module;

a third electronics system module;

a first oscillator which produces first reference clock signals;

a second oscillator which produces second reference clock signals;

a third oscillator which produces third reference clock signals;

a first multiplexer which receives the first, second and third reference clock signals from the first, second and third oscillators and which provides a designated one of the received reference clock signals as a selected reference clock signal;

a second multiplexer which receives the first, second and third reference clock signals from the first, second and third oscillators and which provides the designated one of the received reference clock signals as a selected reference clock signal;

a third multiplexer which receives the first, second and third reference clock signals from the first, second and third oscillators and which provides the designated one of the received reference clock signals as a selected reference clock signal;

a first phase-locked loop (PLL) circuit coupled in a first feedback circuit in which the first PLL receives as reference input the selected reference clock signal provided by the first multiplexer and receives as feedback input a first output clock signal;

a second phase-locked loop (PLL) circuit coupled in a second feedback circuit in which the second PLL receives as reference input the selected reference clock signal provided by the second multiplexer and which receives as feedback input a second output clock signal;

a third phase-locked loop (PLL) circuit coupled in a third feedback circuit in which the third PLL receives as reference input the selected reference clock signal provided by the third multiplexer and receives as feedback input a third output clock signal;

wherein the first oscillator and the first multiplexer and the first PLL are disposed with the first system module and the first clock signal is provided to the first system module;

wherein the second oscillator and the second multiplexer and the second PLL are disposed with the second system module and the second clock signal is provided to the second system module; and wherein the third oscillator and the third multiplexer and the third PLL are disposed with the third system module and the third clock signal is provided to the third system module;

a reference clock designation unit which determines whether any one of the first, second or third reference clock signals is operative at or greater than a prescribed amount faster or is operative at or less than a prescribed amount slower than the other two reference clock signals and which designates one of the two other reference clock signals in the event that one of the reference clock signals is operative at or greater than a prescribed amount faster or is operative at or less than a prescribed amount slower than such other two reference clock signals; and transfer circuitry which transfers respective first, second and third reference clock signals among the first, second and third multiplexers.

11. A method of providing a redundant clock signal in an electronic system which includes first, second and third electronic system modules, the method comprising:

providing first, second and third reference clock signals;

determining whether any one of the first, second or third reference clock signals has failed;

designating one of the two other reference clock signals as the selected reference clock signal in the event that one of the reference clock signals is determined to have failed;

providing the selected reference clock signal to a first phase-locked loop (PLL) circuit coupled in a first feedback circuit in which the first PLL receives as reference input the selected reference clock signal provided by the first multiplexer and receives as feedback input a first output clock signal;

providing the selected reference clock signal to a second phase-locked loop (PLL) circuit coupled in a second feedback circuit in which the second PLL receives as reference input the selected reference clock signal provided by the second multiplexer and which receives as feedback input a second output clock signal; and providing the selected reference clock signal to a third phase-locked loop (PLL) circuit coupled in a third feedback circuit in which the third PLL receives as reference input the selected reference clock signal provided by the third multiplexer and receives as feedback input a third output clock signal.

12. The method of claim 11 wherein determining includes:

determining whether any one of the first, second or third reference clock signals is operative at or greater than a prescribed amount faster or is operative at or less than a prescribed amount slower than the other two reference clock signals.

13. The method of claim 4 wherein determining includes:

counting clock ticks of the first reference clock signal;

counting clock ticks of the second reference clock signal;

counting clock ticks of the third reference clock signal; and comparing the clock tick counts of the first, second and third reference clock signals.

14. The method of claim 11 further comprising:

providing the first clock output signal to a first system module which includes a first processor;

providing the second clock output signal to a second system module which includes a second processor; and providing a third clock output signal to a third system module which includes a third processor.

15. The method of claim 11 further comprising:

providing the first output clock signal as a first bus clock operative with a first bus which serves a first processor;

providing the second output clock signal as a second bus clock operative with a second bus which serves a second processor; and providing the third output clock signal as a third bus clock operative with a third bus which serves a third processor.

16. The method of claim 11 further comprising:

providing the first output clock signal to a first electronics system module;

providing the second output clock signal to a second electronics system module; and providing the third clock signal to a third electronics system module.

17. A method of providing a redundant clock signal in an electronic system which includes first, second and third electronic system modules, the method comprising:

providing first, second and third reference clock signals;

determining whether any one of the first, second or third reference clock signals is operative at or greater than a prescribed amount faster or is operative at or less than a prescribed amount slower than the other two reference clock signals;

designating one of the two other reference clock signals as the selected reference clock signal in the event that one of the reference clock signals is determined to be operative at or greater than a prescribed amount faster or is operative at or less than a prescribed amount slower than the other two reference clock signals;

providing the selected reference clock signal to a first phase-locked loop (PLL) circuit coupled in a first feedback circuit in which the first PLL receives as reference input the selected reference clock signal provided by the first multiplexer and receives as feedback input a first output clock signal;

providing the selected reference clock signal to a second phase-locked loop (PLL) circuit coupled in a second feedback circuit in which the second PLL receives as reference input the selected reference clock signal provided by the second multiplexer and which receives as feedback input a second output clock signal;

providing the selected reference clock signal to a third phase-locked loop (PLL) circuit coupled in a third feedback circuit in which the third PLL receives as reference input the selected reference clock signal provided by the third multiplexer and receives as feedback input a third output clock signal;

providing a first output clock signal to first electronics system module;

providing the second output clock signal to a second electronics system module; and providing the third clock signal to a third electronics system module.

* * * * *

UNITED STATES PATENT AND TRADEMARK OFFICE
CERTIFICATE OF CORRECTION

PATENT NO.    : 6,349,391 B1
DATED         : February 19, 2002
INVENTOR(S)   : Petivan et al.

It is certified that error appears in the above-identified patent and that said Letters Patent is hereby corrected as shown below:

<u>Column 47,</u>
Line 56, replace "4" with -- 11 --.

Signed and Sealed this

Tenth Day of September, 2002

*Attest:*

*Attesting Officer*

JAMES E. ROGAN
*Director of the United States Patent and Trademark Office*